United States Patent
Kagawa

(10) Patent No.: US 6,574,012 B1
(45) Date of Patent: Jun. 3, 2003

(54) COMMUNICATION TERMINAL APPARATUS OF DETERMINING A COMMUNICATION SPEED FOR LINE CONDITION

(75) Inventor: Tetsuya Kagawa, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/301,134

(22) Filed: Apr. 28, 1999

(30) Foreign Application Priority Data

Apr. 28, 1998 (JP) ............................................ 10-118405
Sep. 11, 1998 (JP) ............................................ 10-258029

(51) Int. Cl.$^7$ ................................................. H04N 1/00
(52) U.S. Cl. ..................................... 358/434; 358/405
(58) Field of Search ................................. 358/434, 400, 358/401, 405, 407, 438, 435; 379/100.01, 100.06, 100.14

(56) References Cited

U.S. PATENT DOCUMENTS

| | | | | |
|---|---|---|---|---|
| 3,771,059 A | * | 11/1973 | Butler | 178/88 |
| 4,583,124 A | * | 4/1986 | Tsuji et al. | 358/256 |
| 5,119,367 A | * | 6/1992 | Kawakatsu | 370/54 |
| 5,222,077 A | * | 6/1993 | Krishnan | 375/39 |
| 5,475,691 A | * | 12/1995 | Chapman | 370/110.4 |
| 6,091,807 A | * | 7/2000 | Yoshida | 379/100.01 |
| 6,195,428 B1 | * | 2/2001 | Maruyama | 379/356 |
| 6,393,029 B1 | * | 5/2002 | Turner | 370/419 |

FOREIGN PATENT DOCUMENTS

| | | | | |
|---|---|---|---|---|
| JP | 04 180 461 | * | 6/1992 | H04N/1/32 |
| JP | 07-143314 | * | 6/1995 | H04N/1/32 |
| JP | 2000013582 | * | 6/1998 | H04N/1/32 |

OTHER PUBLICATIONS

V.34 Data Framing; Transmitter of the Modem Data Pump; (Papers by Texas Instrument) Section. 3.6; pp. 41 and 42.*
Space and Path Diversity Combining Techinique for 10 Mbit/s Adaptive Modulation/TDMA in Wireless Communications Systems; Suzuki et al. Apr. 1996 ot May 1996; pp. 1003–1007 of vol. 2.*

* cited by examiner

Primary Examiner—Jerome Grant, II
(74) Attorney, Agent, or Firm—Cooper & Dunham LLP

(57) ABSTRACT

A communication terminal apparatus capable of making a communication with a particular communication destination with optimal settings in accordance with the quality of a line connected thereto. A combination of limited symbol rates is stored corresponding to each of a plurality of destination telephone numbers. When a destination telephone number is specified upon initiating a call, a corresponding combination of limited symbol rates are notified to a reception side apparatus connected to the communication terminal apparatus through a line in response to an initiated call, as information identifying a combination of symbol rates available to the communication terminal apparatus, when the specified destination telephone number is limited in symbol rate.

21 Claims, 22 Drawing Sheets

FIG. 1  PRIOR ART

| SYMBOL RATE | BIT RATE |
|---|---|
| 3429 | 4.8 - 33.6 kbps |
| 3200 | 4.8 - 31.2 kbps |
| 3000 | 4.8 - 28.8 kbps |
| 2800 | 4.8 - 26.4 kbps |
| 2743 | 4.8 - 26.4 kbps |
| 2400 | 2.4 - 21.6 kbps |

FIG. 4

| INFO 0 bit LSB:MSB | DEFINITION |
|---|---|
| 0:3 | FILL BITS: 111 |
| 4:11 | FRAME SYNCHRONIZATION: 01110010 |
| 12 | 1: SUPPORTS SYMBOL RATE 2743 |
| 13 | 1: SUPPORTS SYMBOL RATE 2800 |
| 14 | 1: SUPPORTS SYMBOL RATE 3429 |
| 15 | 1: SUPPORTS SYMBOL RATE 3000 LOW CARRIER |
| 16 | 1: SUPPORTS SYMBOL RATE 3000 HIGH CARRIER |
| 17 | 1: SUPPORTS SYMBOL RATE 3200 LOW CARRIER |
| 18 | 1: SUPPORTS SYMBOL RATE 3200 HIGH CARRIER |
| 19 | 1: SUPPORTS SYMBOL RATE 3429 |
| . . . | |

FIG. 6

RAM — 4

TELEPHONE NUMBER/SYMBOL RATE LIMITING VALUE CORRESPONDENCE TABLE — 4a

| ONE-TOUCH NUMBER | TELEPHONE NUMBER | LIMITATION VALID FLAG | SYMBOL RATE LIMITATION | | | | | |
|---|---|---|---|---|---|---|---|---|
| | | | 3429 | 3200 | 3000 | 2800 | 2743 | 2400 |
| 01 | 0011123456 | 1 | 0 | 1 | 1 | 1 | 0 | 1 |
| 02 | 00161123456 | 1 | 0 | 1 | 1 | 0 | 0 | 1 |
| 03 | 0351234567 | 0 | ✕ | ✕ | ✕ | ✕ | ✕ | ✕ |
| ... | ... | ... | ... | ... | ... | ... | ... | ... |

| IDENTIFICATION NUMBER | SYMBOL RATE LIMITATION | | | | | |
|---|---|---|---|---|---|---|
| | 3429 | 3200 | 3000 | 2800 | 2743 | 2400 |
| 001 | 0 | 1 | 1 | 0 | 0 | 1 |
| 0041 | 0 | 1 | 1 | 0 | 0 | 1 |
| 0061 | 0 | 1 | 1 | 0 | 0 | 1 |
| ⋮ | ⋮ | ⋮ | ⋮ | ⋮ | ⋮ | ⋮ |

| ONE-TOUCH NUMBER | TELEPHONE NUMBER | LIMITATION VALID FLAG | SYMBOL RATE LIMITATION | | | | | |
|---|---|---|---|---|---|---|---|---|
| | | | 3429 | 3200 | 3000 | 2800 | 2743 | 2400 |
| 01 | 00111123456 | 1 | 1 | 1 | 1 | 1 | 0 | 1 |
| 02 | 00161123456 | 1 | 0 | 1 | 1 | 1 | 0 | 1 |
| 03 | 0351234567 | 0 | ✕ | ✕ | ✕ | ✕ | ✕ | ✕ |
| ... | ... | ... | ... | ... | ... | ... | ... | ... |

4a

RAM — 4
- IDENTIFICATION NUMBER REGISTRATNION TABLE — 4c
- COUNTRY NUMBER/SYMBOL RATE LIMITING VALUE CORRESPONDENCE TABLE — 4d

FIG. 17

| IDENTIFICATION NUMBER REGISTRATION TABLE | 4c |
|---|---|
| 001 | |
| 0041 | |
| 0061 | |
| ⋮ | |

| COUNTRY NUMBER | SYMBOL RATE LIMITATION | | | | | |
|---|---|---|---|---|---|---|
| | 3429 | 3200 | 3000 | 2800 | 2743 | 2400 |
| 1 (U.S.A) | 0 | 1 | 1 | 0 | 0 | 1 |
| 44 (UK) | 0 | 0 | 1 | 0 | 0 | 1 |
| 33 (FRANCE) | 0 | 1 | 1 | 0 | 0 | 1 |
| ⋮ | ⋮ | ⋮ | ⋮ | ⋮ | ⋮ | ⋮ |

COMMUNICATION TERMINAL APPARATUS OF DETERMINING A COMMUNICATION SPEED FOR LINE CONDITION

BACKGROUND OF THE INVENTION

1. Field of the Invention

The present invention relates generally to a communication terminal apparatus such as a facsimile apparatus, and more particularly to a communication terminal apparatus capable of determining a symbol rate and a bit rate desirable for use in accordance with conditions of a line connected between a transmission side apparatus and a reception side apparatus.

2. Description of the Related Art

There has been developed a communication terminal apparatus which conforms to a predetermined communication standard such as ITU-T Recommendation V.34 (hereinafter abbreviated as V.34) or the like, and which can provide a reception side apparatus with information relating to a combination of symbol rates available thereto from among a plurality of symbol rates stipulated in the predetermined communication standard. In this way, a communication is made at a symbol rate and a bit rate determined by the reception side apparatus based on the provided information relating to the combination of symbol rates and the characteristics of a line connected therebetween.

The V.34 standard allows communications between communication terminal apparatuses at a bit rate in a range of 2.4 to 33.6 kbps. For realizing this communication on speed, V.34 provides a communication sequence, called line probing, for revealing the characteristics of a line connected between a transmission side apparatus and a reception side apparatus upon starting communication. Using the result of this communication sequence, the transmission side and reception side apparatuses may select for their communication one of six available symbol rates from 2400 to 3429, which are predefined by V.34, as shown in FIG. 1.

As is apparent from FIG. 1, a higher upper limit can be obtained for the bit rate as a higher symbol rate is selected. However, better characteristics are required for a line connected between a transmission side apparatus and a reception side apparatus for communications being performed at a higher bit rate. As is also apparent from FIG. 1, an available upper limit of the bit rate is lower for the lower symbol rates. Communication performed at such a low bit rate can be made even under bad conditions which result from poor characteristics of the line connected between a transmission side apparatus and a reception side apparatus.

While V.34 defines a bit rate range for each of the six available symbol rates, these ranges overlap as shown in FIG. 1. Accordingly, bad conditions due to the characteristics of a line are more acceptable for a communication being performed at a lower symbol rate even with the same bit rate.

In overseas communications, it is generally known that communication quality is generally low since the line connected between the transmission side apparatus and the reception side apparatus is routed through a plurality of communication business entities. Such low line quality causes problems such as longer communication time and higher susceptibility to errors.

In V.34, the characteristics of a line are measured and the measurement result is relied on to determine a symbol rate within a range of symbol rates common to a combination of symbol rates available to the transmission side and a combination of symbol rates available to the reception side, as well as to determine a bit rate.

However, since it is the reception side that finally determines the symbol rate and the bit rate, and ITU-T does not dictate the determination criteria, a communication terminal apparatus such as a facsimile apparatus, which does not have the ability to correctly measure the line characteristics, may tend to set a higher symbol rate and a higher bit rate upon starting a communication. In such a case, errors may frequently occur during communications, causing an increase in communication time, although the communication speed is high. As a result, the transmission side will be burdened with an increased communication rate paid thereby.

Some facsimile apparatuses conforming to ITU-T Recommendation V.17 or earlier have an overseas communication mode in which an upper limit is set to the bit rate within a range of bit rates essentially available thereto to apparently reduce the available bit rate, thereby making overseas communications more stable.

However, with this overseas communication mode, the bit rate is always limited during overseas communications irrespective of communication destinations, so that a communication with a certain destination may become excessively stable. This means that while communication errors are reduced, a longer communication time is required due to a limited bit rate, thereby resulting in an increased communication rate.

SUMMARY OF THE INVENTION

The present invention provides a communication terminal apparatus adapted to notify a reception side apparatus, connected thereto in response to a call made by the communication terminal apparatus through a line to a specified destination telephone number entered to the communication terminal apparatus, of at least information on a combination of symbol rates available to the communication terminal apparatus within a plurality of symbol rates defined by a predetermined communication standard, to communicate with the reception side apparatus at a symbol rate and a bit rate determined by the reception side apparatus based on the notified information on the combination of symbol rates and the characteristics of the line connected thereto. The communication terminal apparatus includes a telephone number/limited symbol rate correspondence table for storing a combination of limited symbol rates which is set by selecting a portion or all of a combination of symbol rates essentially available to the communication terminal apparatus, wherein the combination of limited symbol rates is stored corresponding to each of destination telephone numbers, and communication control means responsive to a specified destination telephone number entered to the communication terminal apparatus upon initiating a call to determine whether or not the specified destination telephone number is limited in symbol rate with reference to the telephone number/limited symbol rate correspondence table, wherein the communication control means is operative when determining that the specified destination telephone number is limited in symbol rate to notify the reception side apparatus of a corresponding combination of limited symbol rates as information on a combination of symbol rates available to the communication terminal apparatus to make a communication with the reception side apparatus.

The present invention also provides a communication terminal apparatus adapted to notify a reception side apparatus, connected thereto in response to a call made by the communication terminal apparatus through a line to a specified destination telephone number entered to the communication terminal apparatus, of at least information on a combination of symbol rates available to the communication terminal apparatus within a plurality of symbol rates defined by a predetermined communication standard, to communicate with the reception side apparatus at a symbol rate and a bit rate determined by the reception side apparatus based on the notified information on the combination of symbol rates and the characteristics of the line connected thereto. The communication terminal apparatus includes an identification number/limited symbol rate correspondence table for storing a combination of limited symbol rates which is set by selecting a portion or all of a combination of symbol rates essentially available to the communication terminal apparatus, wherein the combination of limited symbol rates is stored corresponding to each of identification numbers, and communication control means responsive to a specified destination telephone number entered to the communication terminal apparatus upon initiating a call to determine whether or not a number sequence at the beginning of the specified destination telephone number is coincident with an identification number which is limited in symbol rate with reference to the identification number/limited symbol rate correspondence table, wherein the communication control means is operative when determining that the identification number is limited in symbol rate to notify the reception side apparatus of a corresponding combination of limited symbol rates as information on the combination of symbol rates available to the communication terminal apparatus to make a communication with the reception side apparatus.

Preferably, the communication terminal apparatus may further includes communication state detecting means for detecting a symbol rate and a bit rate determined by the reception side apparatus and used to actually make a communication between the communication terminal apparatus and the reception side apparatus which is connected through the communication control means to the communication terminal apparatus through a line in response to a call made by the communication terminal apparatus to a destination telephone number stored in the telephone number/limited symbol rate correspondence table, and symbol rate limitation alleviating means responsive to a symbol rate detected by the communication state detecting means after the communication has been normally completed without producing errors, wherein when the detected symbol rate is the highest one of symbol rates included in the combination of limited symbol rates stored in the telephone number/limited symbol rate correspondence table corresponding to the destination telephone number, and when a bit rate detected by the communication state detecting means is an upper limit bit rate which can be set at the highest symbol rate, the symbol rate limitation alleviating means additionally sets a symbol rate one rank higher than the highest symbol rate within the combination of symbol rates essentially available to the communication terminal apparatus as the combination of limited symbol rates stored in the telephone number/limited symbol rate correspondence table corresponding to the destination telephone number.

The present invention further provides a communication terminal apparatus adapted to notify a reception side apparatus, connected thereto in response to a call made by the communication terminal apparatus through a line to a specified destination telephone number entered to the communication terminal apparatus, of at least information on a combination of symbol rates available to the communication terminal apparatus within a plurality of symbol rates defined by a predetermined communication standard, to communicate with the reception side apparatus at a symbol rate and a bit rate determined by the reception side apparatus based on the notified information on the combination of symbol rates and the characteristics of the line connected thereto. The communication terminal apparatus includes an identification number registration table for storing previously registered identification numbers, a country number/limited symbol rate correspondence table for storing a combination of limited symbol rates which is set by selecting a portion or all of a combination of symbol rates essentially available to the communication terminal apparatus, wherein the combination of limited symbol rates is stored corresponding to each of country numbers, and communication control means responsive to a specified destination telephone number entered to the communication terminal apparatus upon initiating a call to reference the identification number registration table and the country number/limited symbol rate correspondence table, wherein the communication control means is operative when a number sequence at the beginning of the specified destination telephone number has been registered as an identification number in the identification number registration table, and when a number sequence subsequent to the identification number in the destination telephone number represents a country number registered in the country number/limited symbol rate correspondence table to notify the reception side apparatus of a combination of limited symbol rates corresponding to the country number, as information on a combination of symbol rates available to the communication terminal apparatus to make a communication with the reception side apparatus.

The present invention further provides a communication terminal apparatus adapted to notify a reception side apparatus, connected thereto in response to a call made by the communication terminal apparatus through a line to a specified destination telephone number entered to the communication terminal apparatus, of at least information on a combination Of symbol rates available to the communication terminal apparatus within a plurality of symbol rates defined by a predetermined communication standard, to communicate with the reception side apparatus at a symbol rate and a bit rate determined by the reception side apparatus based on the notified information on the combination of symbol rates and the characteristics of the line connected thereto. The communication terminal apparatus includes a telephone number/limited symbol rate correspondence table for storing a combination of limited symbol rates which is set by selecting a portion or all of a combination of symbol rates essentially available to the communication terminal apparatus, wherein the combination of limited symbol rates is stored corresponding to each of destination telephone numbers, an identification number registration table for storing previously registered identification numbers, a country number/limited symbol rate correspondence table for storing a combination of limited symbol rates which is set by selecting a portion or all of the combination of symbol rates essentially available to the communication terminal apparatus, wherein the combination of limited symbol rates is stored corresponding to each of country numbers, and communication control means responsive to a specified destination telephone number entered to the communication terminal apparatus upon initiating a call to reference the telephone number/limited symbol rate correspondence table, the identification number registration table and the country number/limited symbol rate correspondence table, wherein the communication control means is operative when the specified destination telephone number is registered in the telephone number/limited symbol rate correspondence table to notify the reception side apparatus of a combination of limited symbol rates corresponding to the destination telephone number as information on a combination of symbol rates available to the communication terminal apparatus to make a communication with the reception side apparatus, and the communication control means is further operative when the specified destination telephone number is not registered in the telephone number/limited symbol rate correspondence table, and when a number sequence at the beginning of the specified destination telephone number has been registered as an identification number in the identification number registration table and when a number sequence subsequent to the identification number in the destination telephone number represents a country number registered in the country number/limited symbol rate correspondence table to notify the reception side apparatus of a combination of limited symbol rates corresponding to the country number, as information on a combination of symbol rates available to the communication terminal apparatus to make a communication with the reception side apparatus.

The present invention further provides a communication terminal apparatus adapted to notify a reception side apparatus, connected thereto in response to a call made by the communication terminal apparatus through a line to a specified destination telephone number entered to the communication terminal apparatus, of at least information on a combination of symbol rates available to the communication terminal apparatus within a plurality of symbol rates defined by a predetermined communication standard, to communicate with the reception side apparatus at a symbol rate and a bit rate determined by the reception side apparatus based on the notified information on the combination of symbol rates and the characteristics of the line connected thereto. The communication terminal apparatus includes an identification number/limited symbol rate correspondence table for storing a combination of limited symbol rates which is set by selecting a portion or all of a combination of symbol rates essentially available to the communication terminal apparatus, wherein combination of limited symbol rates is stored corresponding to each of identification numbers, a country number/limited symbol rate correspondence table for storing a combination of limited symbol rates which is set by selecting a portion or all of the combination of symbol rates essentially available to the communication terminal apparatus, wherein the combination of limited symbol rates is stored corresponding to each of country numbers, and communication control means responsive to a specified destination telephone number entered to the communication terminal apparatus upon initiating a call to reference the identification number/limited symbol rate correspondence table and the country number/limited symbol rate correspondence table, wherein when a number sequence at the beginning of the destination telephone number has been registered as an identification number in the identification number/limited symbol rate correspondence table, the communication control means is operative, when a number sequence subsequent to the identification number in the destination telephone number represents a country number registered in the country number/limited symbol rate correspondence table to notify the reception side apparatus of a combination of limited symbol rates corresponding to the country number, as information on a combination of symbol rates available to the communication terminal apparatus, to make a communication with the reception side apparatus, and when the number sequence subsequent to the identification number in the destination telephone number does not represent a country number registered in the country number/limited symbol rate correspondence table to notify the reception side apparatus of a combination of limited symbol rates corresponding to the identification number, as information on a combination of symbol rates available to the communication terminal apparatus to make a communication with the reception side apparatus.

The present invention further provides a communication terminal apparatus adapted to notify a reception side apparatus, connected thereto in response to a call made by the communication terminal apparatus through a line to a specified destination telephone number entered to the communication terminal apparatus, of at least information on a combination of symbol rates available to the communication terminal apparatus within a plurality of symbol rates defined by a predetermined communication standard, to communicate with the reception side apparatus at a symbol rate and a bit rate determined by the reception side apparatus based on the notified information on the combination of symbol rates and the characteristics of the line connected thereto. The communication terminal apparatus includes an identification number/limited symbol rate correspondence table for storing a combination of limited symbol rates which is set by selecting a portion or all of a combination of symbol rates essentially available to the communication terminal apparatus, wherein the combination of limited symbol rates is stored corresponding to each of identification numbers, a country number/limited symbol rate correspondence table for storing a combination of limited symbol rates which is set by selecting a portion or all of the combination of symbol rates essentially available to the communication terminal apparatus, wherein the combination of limited symbol rates is stored corresponding to each of country numbers, and communication control means responsive to a specified destination telephone number entered to the communication terminal apparatus upon initiating a call to reference the identification number/limited symbol rate correspondence table and the country number/limited symbol rate correspondence table, wherein the communication control means is operative when a number sequence at the beginning of the destination telephone number is not registered as an identification number in the identification number/limited symbol rate correspondence table, and when a number sequence subsequent to the identification in the destination telephone number represents a country number registered in the country number/limited to symbol rate correspondence table to notify the reception side apparatus of a combination of limited symbol rates corresponding to the country number, as information on a combination of symbol rates available to the communication terminal apparatus to make a communication with the reception side apparatus.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1 is a table showing symbol rates available in V.34 and ranges of bit rates which can be set corresponding to the respective symbol rates;

FIG. 4 is a table showing a portion of a bit definition for an INFO0 sequence;

FIG. 6 is a diagram illustrating a storage area reserved in a RAM for a telephone number/symbol rate limiting value correspondence table in a first embodiment;

FIG. 7 is a table showing specific contents of the telephone number/symbol rate limiting value correspondence table stored in the RAM in the first embodiment;

FIG. 17 is a table showing specific contents of the identification number registration table;

FIG. 18 is a table showing specific contents of the country number/symbol rate limiting value correspondence table;

FIG. 23 is a diagram illustrating storage areas reserved in the RAM for the country number/symbol rate limiting value correspondence table and the identification number/symbol rate limiting value correspondence table in a sixth or seventh embodiment;

DETAILED DESCRIPTION OF THE PREFERRED EMBODIMENTS

The present invention will hereinafter be described in detail in conjunction with several embodiments thereof with reference to the accompanying drawings.

Figure 2:
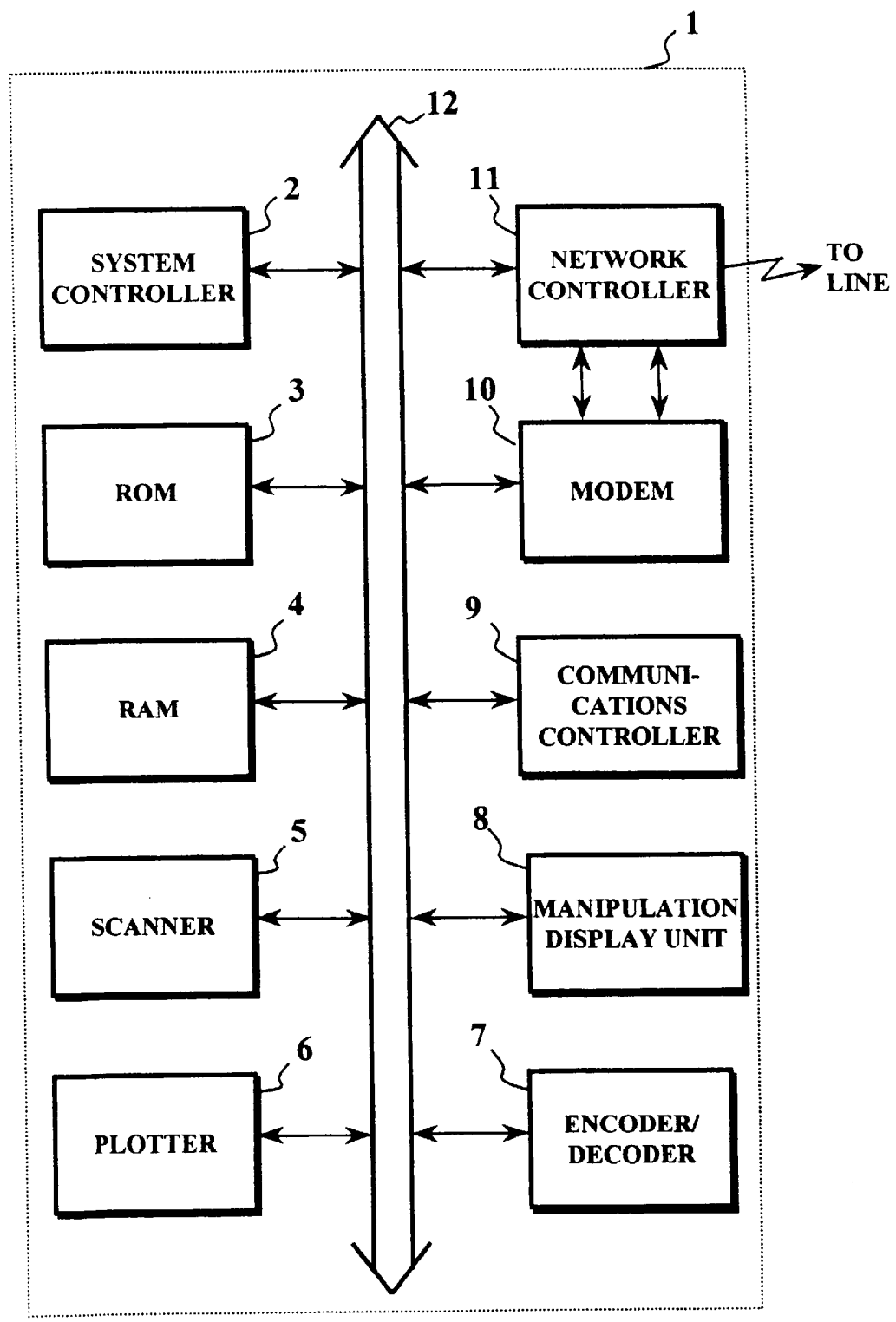
FIG. 2 is a block diagram illustrating a facsimile apparatus which embodies a communication terminal apparatus according to one embodiment of the present invention.

FIG. 2 illustrates in block diagram form a facsimile apparatus 1 as a communication terminal apparatus according to an embodiment of the present invention. The facsimile apparatus 1 includes a system controller 2, a ROM (read only memory) 3, a RAM (random access memory) 4, a scanner 5, a plotter 6, an encoder/decoder 7, a manipulation/display unit 8, a communications controller 9, a modem 10, a network controller 11, and a system bus 12.

The system controller 2 controls each of the components constituting the facsimile apparatus 1 in accordance with a control program previously stored in the ROM 3 using the RAM 4 as a working region. The ROM 3 stores the control program, as mentioned above, for use by the system controller 2 to control each of the components constituting the facsimile apparatus 1. The RAM 4 temporarily stores various kinds of data and is used by the system controller 2 as a working area, as mentioned above. The RAM 4 is backed up by a backup circuit (not shown) so that the contents stored therein are held even when the facsimile apparatus 1 is powered off.

The scanner 5 reads an original image at a predetermined line density such as 3.85 lines/mm, 7.7 lines/mm, 15.4 lines/mm or the like to produce image information. The plotter 6 records or outputs received image information in accordance with a line density at which the received image information was produced, and records or outputs image information read by the scanner 5 in accordance with a line density of the image information (copy operation).

The encoder/decoder 7 encodes or compresses transmit image data in accordance with a predetermined encoding scheme such as the MH (modified Huffman) encoding scheme, MR (modified READ) encoding scheme, MMR (modified modified READ) encoding scheme or the like adapted to the G3 facsimile, and decodes or decompresses received image data in accordance with a predetermined decoding scheme corresponding to the MH encoding scheme, MR encoding scheme, MMR encoding scheme or the like.

The manipulation/display unit 8 is provided with numeral keys for specifying a destination telephone number or the like, a transmission start key, a one-touch call key and a variety of other keys, and also with a display such as a liquid crystal display for displaying an operating condition of the facsimile apparatus 1 and a variety of messages which should be notified to the user.

Figure 3:
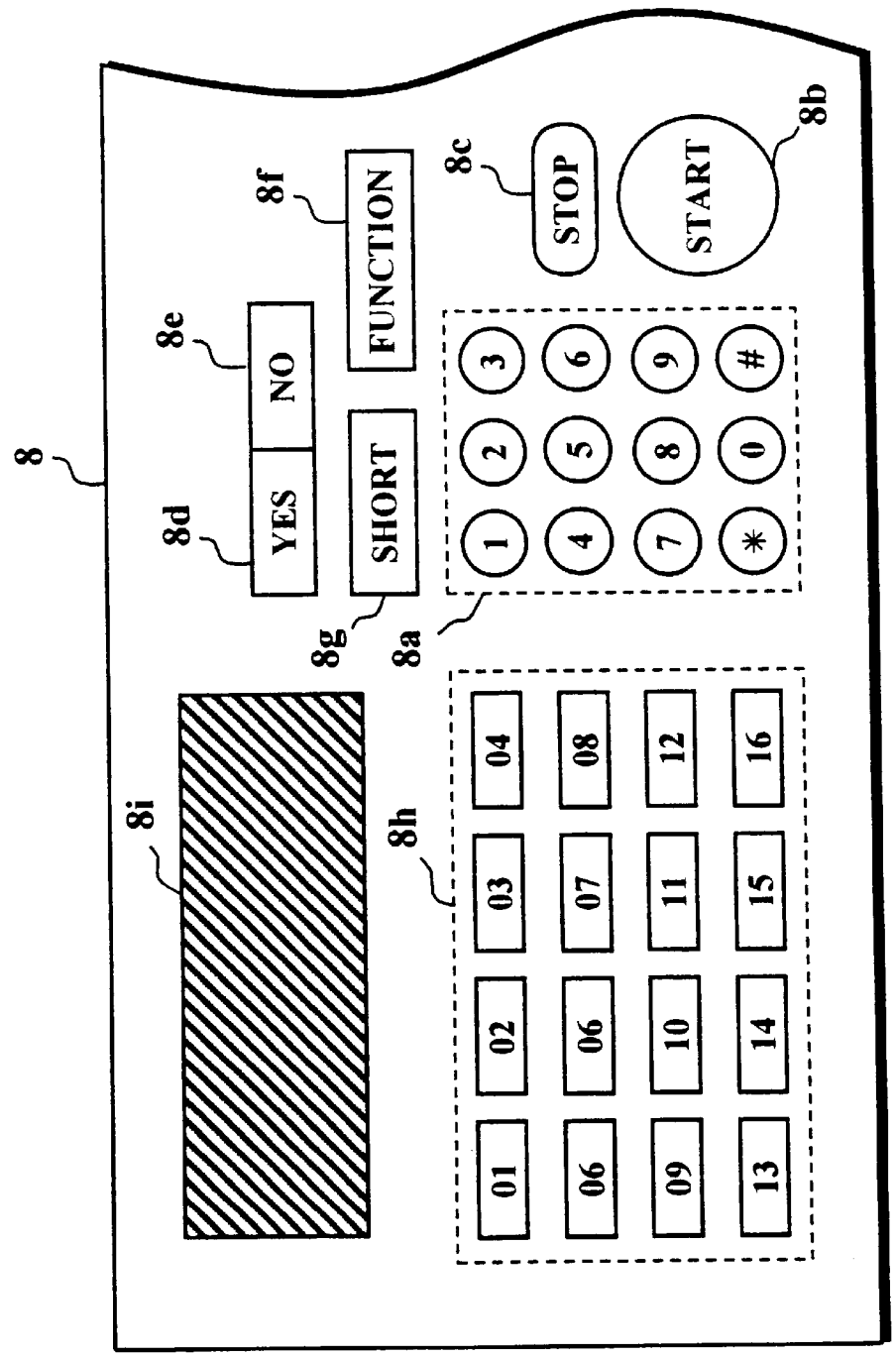
FIG. 3 is a schematic diagram illustrating an example of a layout on a manipulation/display unit of the facsimile apparatus according to the embodiment of the present invention, where parts not directly related to the embodiment are omitted.

An example of a layout for the manipulation/display unit 8 is illustrated in FIG. 3. Specifically, the numeral keys, generally designated by 8a, are used to directly specify a telephone number of a communication destination or the like, and to specify a telephone number with a registered short number. A [Start] key 8b is used to instruct the facsimile apparatus 1 to start a facsimile transmission operation, or to start a copy operation. A [Stop] key 8c is used to instruct the facsimile apparatus 1 to forcedly stop a variety of operations under way. A [Yes] key 8d and a [No] key 8e are keys for use by the user to determine selection and cancellation of a variety of functions.

A [Function] key 8f is used to invoke a one-touch call registration function; a short number registration function; and a user parameter setting function, as well as extensive functions other than the general functions of a standard facsimile apparatus, such as a time specified transmission, a department code specified transmission or the like provided by the facsimile apparatus 1. Any such function can be invoked for execution by pushing the [Function] key 8f and entering a number corresponding to the intended function through the numeral keys 8a.

The [Short] key 8g is provided for a short number call function. Specifically, a registered short number, i.e., a short version of a telephone number is specified by a combination of pushing on the [Short] key 8g and entry of a numeral value of several digits (in this embodiment, a two digit numeral value in a range of 01 to 99) through the numeral keys 8a. A group of one-touch keys 8h provides a one-touch call function, and includes keys corresponding to numbers "0" to "16," respectively. Specifically, a registered number for the one-touch call function may be specified by pushing any one-touch key. A display 8i displays an operating condition of the facsimile apparatus 1 and a variety of messages associated therewith which should be notified to the user.

In FIG. 2, the communication controller 9 controls the modem 10 and the network controller 11 to perform a facsimile communication. The modem 10, which conforms to ITU-T Recommendation V.34, modulates data to be transmitted to a line through the network controller 11 and demodulates a signal received from the line through the network controller 11. In addition, the modem 10 sends a DTMF signal corresponding to an input telephone number. The network controller 11, connected to a line, is responsible for the control associated with connection with the line, such as closing and opening of a direct current loop or the like; detection of polarity inversion on the line; detection of the released line; detection of a dialing tone; detection of a tone signal such as a busy tone (occupied) or the like; detection of a ringing signal; or the like. The network controller 11 is also responsible for generation of a dial pulse. The system bus 12 provides a signal path for the respective components of the facsimile apparatus 1 to transmit and receive data therebetween.

Next, ITU-T Recommendation V.34 as it relates to the present invention will be discussed prior to describing specific operations of the facsimile apparatus 1 which embodies the communication terminal apparatus according to the present embodiment. Referring again to FIG. 1, the available symbol rates in V.34 and ranges of bit rates which can be set corresponding to the respective symbol rates are discussed below. As shown in FIG. 1, the highest bit rate in V.34, i.e., 33.6 kbps, can be realized only with the highest symbol rate of 3429. Since the highest bit rate requires a maximum frequency bandwidth, a communication at this symbol rate is more susceptible to a variety of influences on the line and relatively susceptible to communication errors, as compared with a communication at a relatively low symbol rate. In addition, with a poor line quality, the symbol rate cannot be set at the highest value 3429 and a lower symbol rate must be set instead. That is, with a poor line quality, with a high symbol rate, a communication is still susceptible to a variety of influences on the line and relatively susceptible to communication errors, as compared with a communication at a lower symbol rate.

In V.34, combinations of symbol rates available to respective facsimile apparatuses are notified to each other through respective INFO0 sequences (INFO0c for an originating party, and INFO0a for an incoming party).

FIG. 4 shows a portion of bit definitions in the INFO0 sequence. Referring specifically to FIG. 4, subsequent to fill bits from the 0th to the 3rd bits and a bit sequence for frame synchronization from the 4th to 11th bits, the 12th to 19th bits are used to notify the incoming party of a combination of symbol rates available to an originating party, and vice versa. The combination of symbol rates set in the 12th to 19th bits is the very combination of symbol rates essentially available to each party for making the best of the communication capabilities provided therein.

It is assumed herein that a combination of essentially available symbol rates in the facsimile apparatus 1 as the communication terminal apparatus according to this embodiment includes all the ranges of symbol rates available in V.34 previously shown in FIG. 1.

Figure 5:
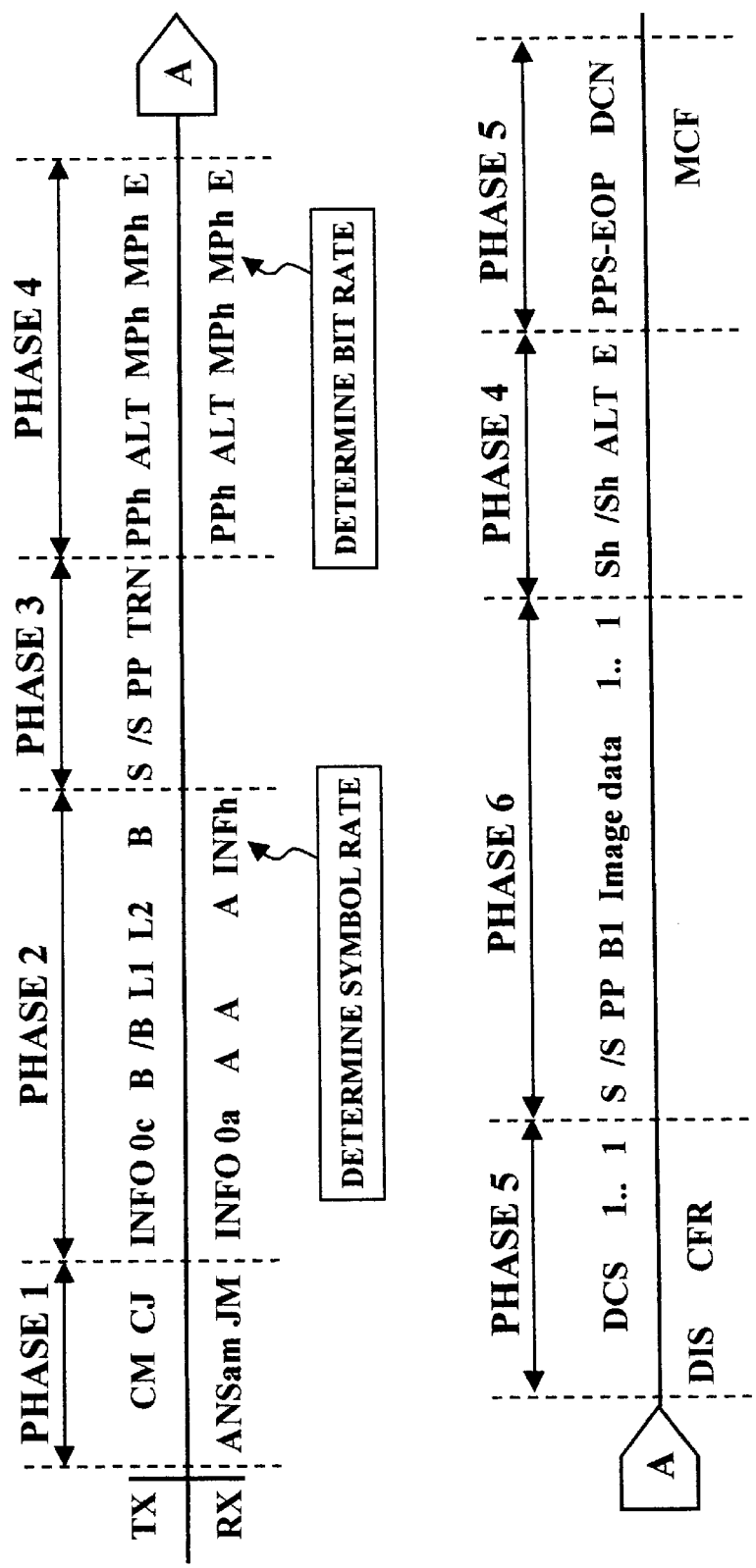
FIG. 5 illustrates a basic sequence of a facsimile communication conforming to V.34.

FIG. 5 illustrates a basic sequence of a facsimile communication conforming to V.34. Referring specifically to FIG. 5, combinations of symbol rates respectively available to the transmission side (originating party) and the reception side (incoming party) are mutually notified through INFO0c (originating party) and INFO0a (incoming party) in Phase 2. From the result of a measurement made by the reception side of probing signals L1/L2 sent from the transmission side, the reception side determines, as an upper limit, the highest symbol rate common to the combination of symbol rates available to the transmission side apparatus, notified therefrom, and the combination of symbol rates available to the reception side apparatus itself, and notifies the upper limit to the transmission side through an INFOh signal for setting the same on the transmission side. Then, in Phase 3 and Phase 4, a bit rate employed in an actual communication is determined and set based on the result of a TRN sequence and the result of an MPh sequence.

With the sequence of determining the bit rate as described above, a higher bit rate can be used when the reception side determines and sets a higher symbol rate, whereas the bit rate is limited to a lower rate when the reception side determines and sets a lower symbol rate. On the other hand, when the bit rate is determined and set at a particular level, a plurality of candidates exist for the symbol rate at which that particular bit rate can be set, as shown in FIG. 1, wherein a higher symbol rate is less immune to noise from a line or an exchange office, whereas a lower symbol rate is more immune to such noise.

Next, specific operations of the facsimile apparatus 1 as the communication terminal apparatus according to the present invention will be described separately in conjunction with first to seventh embodiments.

In the first embodiment, a storage area is reserved in the RAM 4 for a telephone number/symbol rate limiting value correspondence table 4a, as shown in FIG. 6. Referring to FIG. 7, in which specific contents of the telephone number/symbol rate limiting value correspondence table 4a are shown, the telephone number/symbol rate limiting value correspondence table 4a is structured as a collection of records, each of which is composed of fields labeled "telephone number," "limitation valid flag" and "symbol rate limiting value" corresponding to each of a plurality of one-touch numbers.

Figure 8:
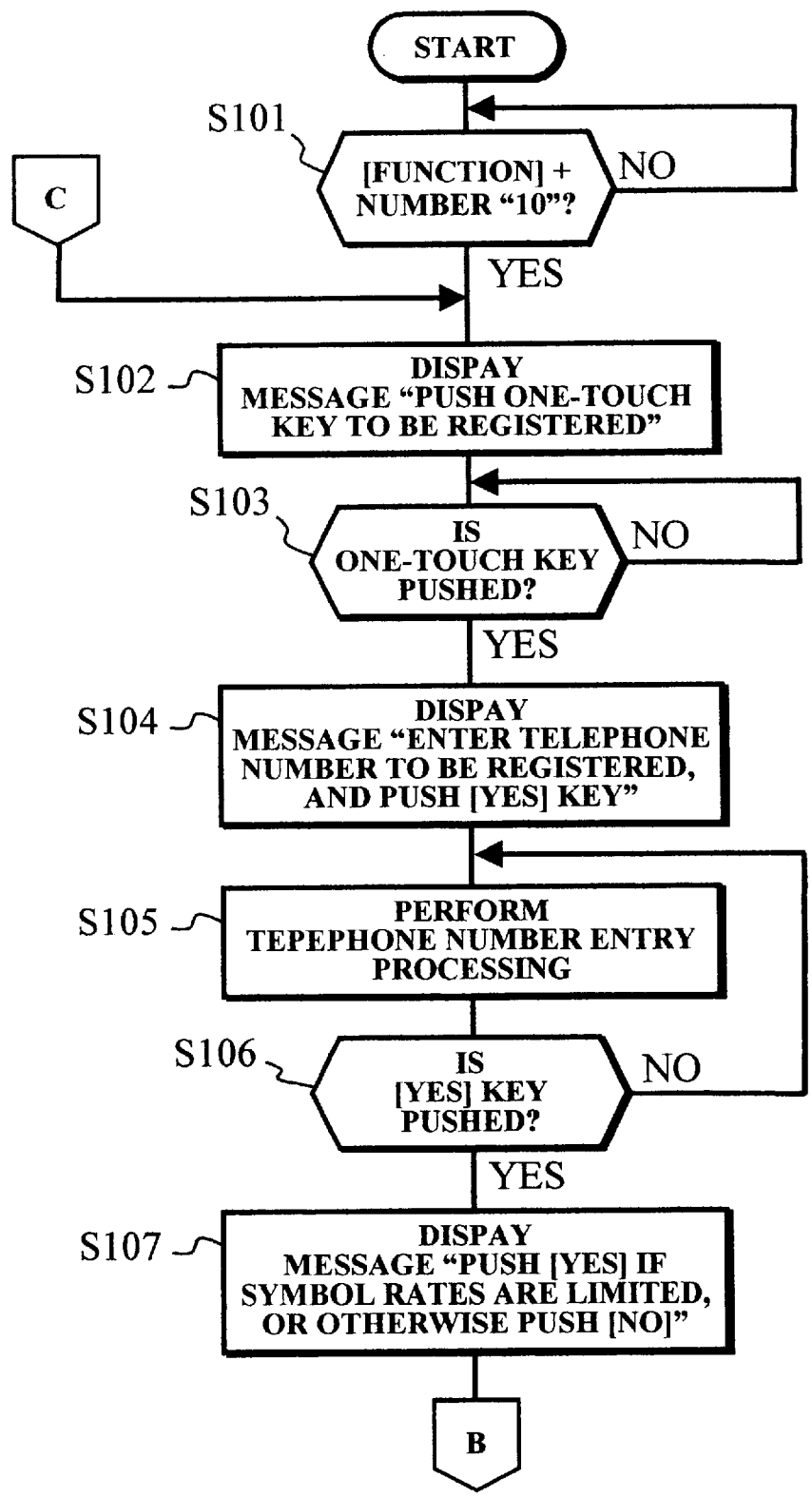
FIGS. 8 and 9 are flow charts illustrating in combination a procedure for one-touch call registration processing according to the first embodiment.
Figure 9:
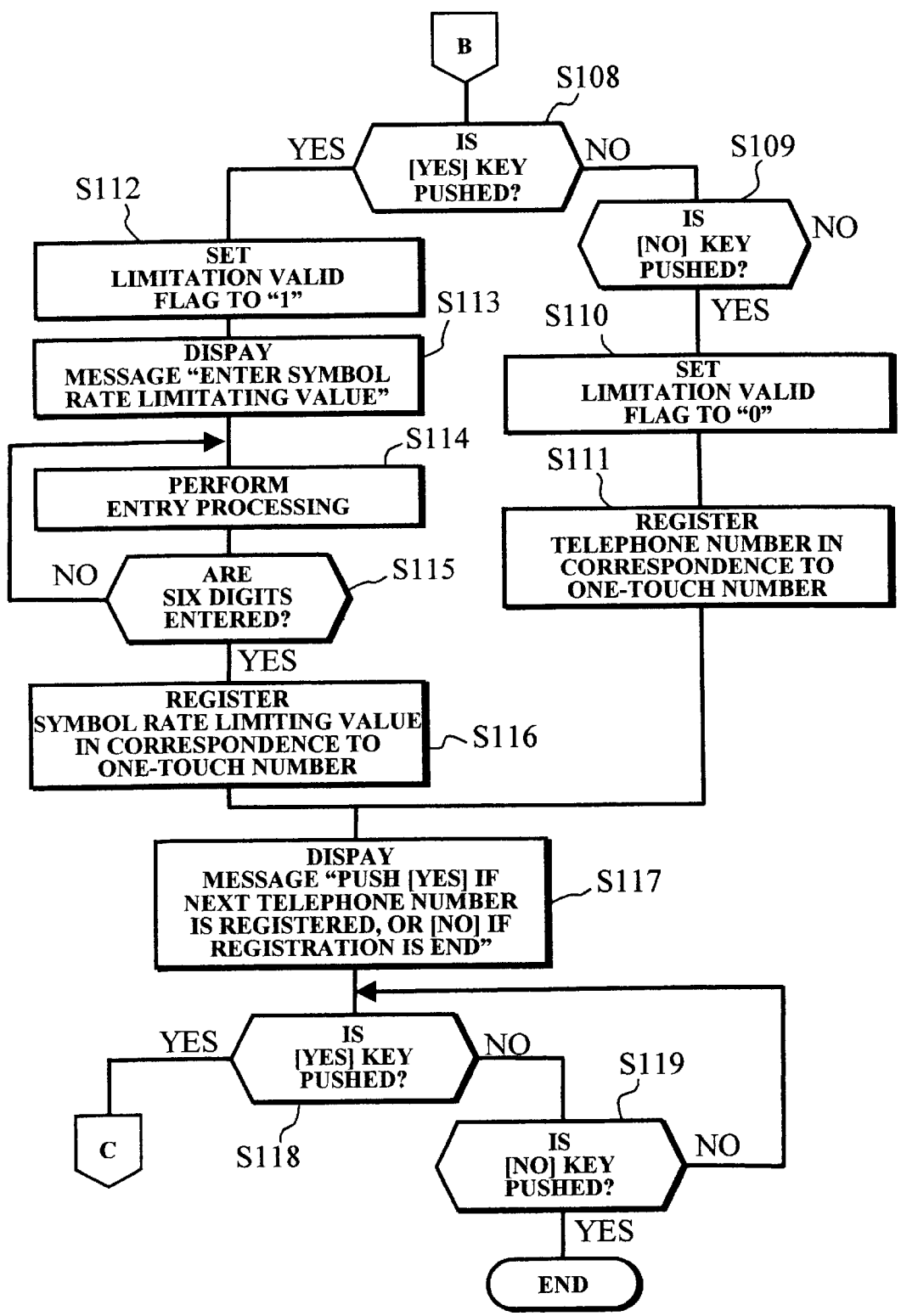

Next, a procedure for one-touch dial registration processing according to the first embodiment will be described with reference to FIGS. 8 and 9. In FIGS. 8 and 9, the system controller 2 monitors whether the user has pushed the [Function] key 8f and then entered a number "10" through the numeral keys 8a, i.e., whether or not a one-touch call registration mode is invoked (represented by a loop taking a No branch from decision step S101).

When the one-touch call registration mode is invoked (Yes at determination step S101), the system controller 2 displays a message stating "Push a one-touch key to be registered" on the display 8i (step S102), and the system controller 2 waits for the user to push any one-touch key within the one-touch key group 8h (a loop taking a No branch from decision step S103).

When any one-touch key is pushed (Yes at step S103), the system controller 2 further displays a message stating "Enter a telephone number to be registered, and push [Yes] key" on the display 8i (step S104), and waits for the user to push [Yes] key 8d (a loop taking a No branch from decision step S106) while performing telephone number entry processing (step S105).

When [Yes] key 8d is pushed (Yes at decision step S106), the system controller 2 displays a message stating "Push [Yes] if symbol rates are limited, or otherwise push [No]" on the display 8i (step S107), and waits for the user to push [Yes] key 8d (No at decision step S108) or [No] key 8e (a loop taking a No branch from decision step S109).

Then, when [No] key 8e is Pushed (Yes at decision step S109), the system controller 2 sets a limitation valid flag to zero (step S110), and registers the telephone number entered at step S105 and the limitation valid flag reset at step S110 in correspondence to a one-touch number associated with the one-touch key pushed at decision step S103 in the telephone number/symbol rate limiting value correspondence table 4a of FIG. 7 stored in the RAM 4 (step S111). The flow then proceeds to step S117.

Conversely, when [Yes] key 8d is pushed (Yes at decision step S108), the system controller 2 sets the limitation valid flag to one (step S112), displays a message stating "Enter a symbol rate limiting value" on display 8i (step S113), and waits for the user to enter six digits, for example "011001" (a loop taking a No branch from decision step S115) while performing processing for entering a symbol rate limiting value (step S114).

When six digits are entered (Yes at decision step S115), the system controller 2 registers the telephone number entered at step S105, the limitation valid flag set at step S112 and the symbol rate limiting value entered at step S114 in correspondence to a one-touch number associated with the one-touch key pushed at decision step S103 in the telephone number/symbol rate limiting value correspondence table 4a of FIG. 7 stored in the RAM 4 (step S116). The flow then proceeds to step S117.

At step S117, the system controller 2 displays a message stating "Push [Yes] if next telephone number is registered, or [No] if registration is end" on the display 8i (step S117), and waits for the user to push [Yes] key 8d (No at decision step S118) or [No] key 8e (a loop taking a No branch from decision step S119).

Then, the system controller 2 terminates the procedure for one-touch call registration processing when [No] key 8e is pushed (Yes at decision step S119) or returns to step S102 to repeatedly execute the one-touch call registration processing when [Yes] key 8d is pushed (Yes at decision step S118).

In this way, as illustrated in FIG. 7, the telephone number/symbol rate limiting value correspondence table 4a is registered with a "telephone number" associated with each one-touch button; and the "limitation valid flag" corresponding to the "telephone number" indicates whether the "telephone number" is limited in symbol rate (when at "1") or not (when at "0"), and is further registered with a symbol rate limiting value when the "limitation valid flag" is at "1." The symbol rate limiting value, when entered as "011001," means that "0" is set to a symbol rate 3249; "1" to 3200; "1" to 3000; "0" to 2800; "0" to 2743; and "1" to 2400, and only the symbol rates with the associated bit set at "1" are included in a combination of symbol rates that are limitedly available to the corresponding telephone number.

While in the processing procedure illustrated in FIGS. 8 and 9, the symbol rate limiting value is registered corresponding to a telephone number associated with a one touch number, the symbol rate limiting value may be alternatively registered corresponding to a telephone number associated with a short number. Further alternatively, the symbol rate limiting value may be registered corresponding to a telephone number which may be entered directly through the numeral keys 8a in case a telephone number is directly entered (direct call). While description is omitted here, it is assumed in the first embodiment that a symbol rate limiting value is registered likewise for a short number and a directly entered telephone number in correspondence to any telephone number which may require a limitation to some symbol rates by executing a similar processing procedure to that illustrated in FIGS. 8 and 9 for the one-touch call registration mode.

Figure 10:
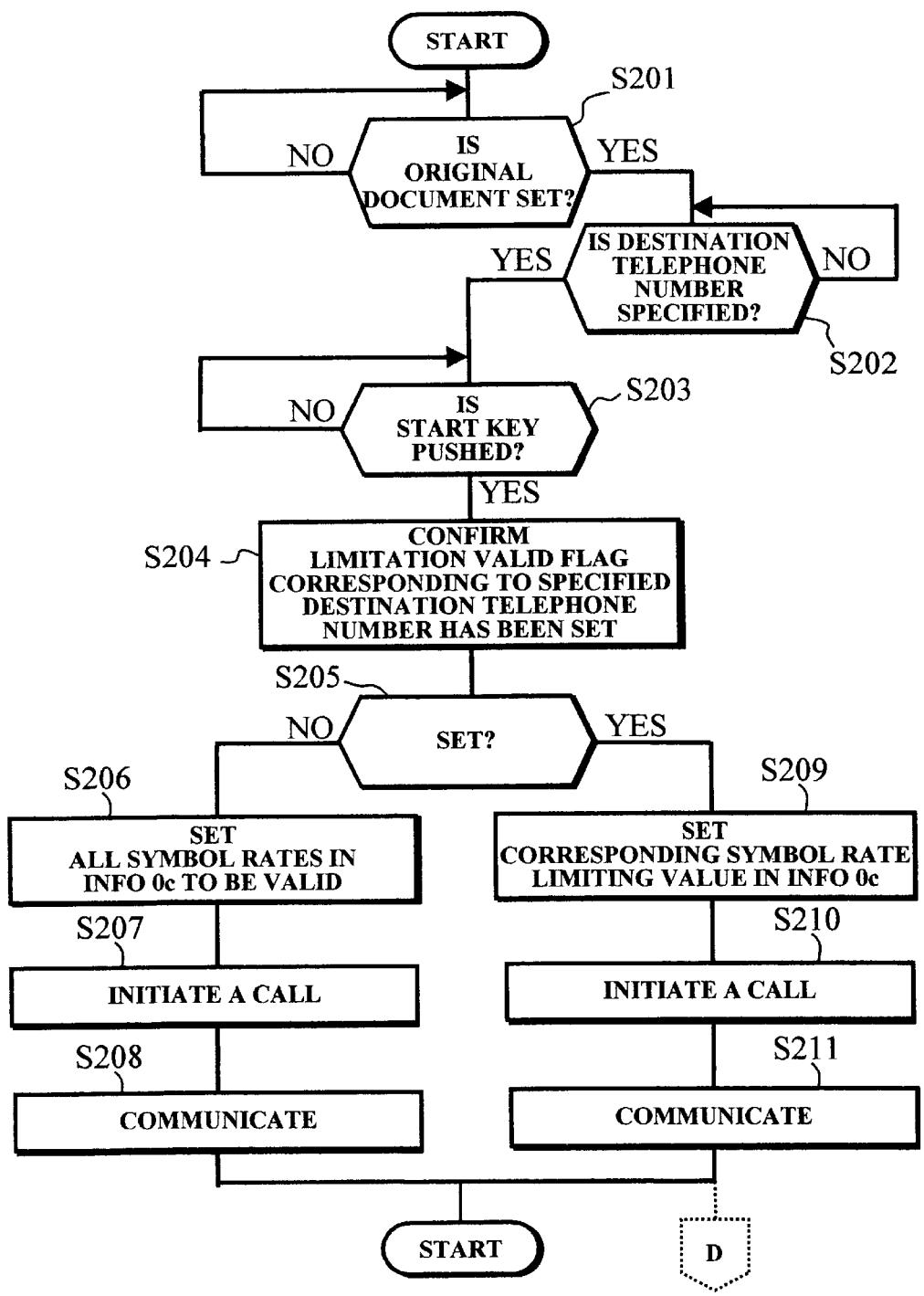
FIG. 10 is a flow chart illustrating a communication processing procedure according to the first embodiment.

Next, a communication processing procedure according to the first embodiment will be described with reference to FIG. 10. In FIG. 10, the system controller 2 first monitors whether an original document has been set in the scanner 5 (a loop taking a No branch from decision step S201). As an original document is set in the scanner 5 (Yes at decision step S201), the system controller 2 monitors whether a destination telephone number has been specified by pushing a one-touch key, entry of a short number through the numeral keys 8a, or direct entry of a telephone number through the numeral keys 8a (a loop taking a No branch from decision step S202). When a destination telephone number is specified in any way (Yes at decision step S202), the system controller 2 monitors whether [Start] key 8b is pushed for instructing the start of a communication (a loop taking a No branch from decision step S203).

When [Start] key 8b is eventually pushed to instruct the start of a communication (Yes at decision step S203), the system controller 2 confirms whether the limitation valid flag corresponding to the destination telephone number specified at decision step S202 has been set (step S204). Specifically, for example, when the destination telephone number is specified by pushing a one-touch key at decision step S202, the system controller 2 looks up the limitation valid flag corresponding to a telephone number associated with the pushed or specified one-touch key in the telephone number/symbol rate limiting value correspondence table 4a of FIG. 7, and confirms whether the limitation valid flag is set for the telephone number.

When the limitation valid flag is not set (No at decision step S205), i.e., when the destination telephone number is not limited in symbol rate, the system controller 2 sets all of the available symbol rates in V.34 to be valid as symbol rates available to the facsimile apparatus 1 on the transmission side (step S206), which are notified to the reception side through INFO0c. Then, the facsimile apparatus 1 initiates a call to the destination telephone number specified at decision step S202 (step S207), and makes a communication with a reception side apparatus connected thereto through a line in accordance with the communication sequence illustrated in FIG. 5 (step S208).

Conversely, when the limitation valid flag is set (Yes at decision step S205), i.e., when the destination telephone number is limited in symbol rate, the system controller 2 sets only a combination of symbol rates specified by the symbol rate limiting values, registered corresponding to the destination telephone number, to be valid as symbol rates available to the facsimile apparatus 1 (step S209), which are notified to the reception side through INFO0c. Then, the facsimile apparatus 1 initiates a call to the destination telephone number specified at decision step S202 (step S210), and makes a communication with the reception side apparatus connected thereto through the line in accordance with the communication sequence illustrated in FIG. 5 (step S211).

In the communication at step S211, since the combination of limited symbol rates registered corresponding to the destination telephone number specified at decision step S202 is notified to the reception side associated with the destination telephone number as a combination of symbol rates available to the facsimile apparatus 1, it is possible to avoid setting higher symbol rates exceeding the combination of the limited symbol rates, so that a communication can be made with optimal settings depending on the quality of a line between the facsimile apparatus 1 and each communication destination.

Next, a second embodiment will be described. In the second embodiment, a storage area is reserved in the RAM 4 for an identification number/symbol rate limiting value correspondence table 4b, as shown in FIG. 11.

Figures 11, 12:
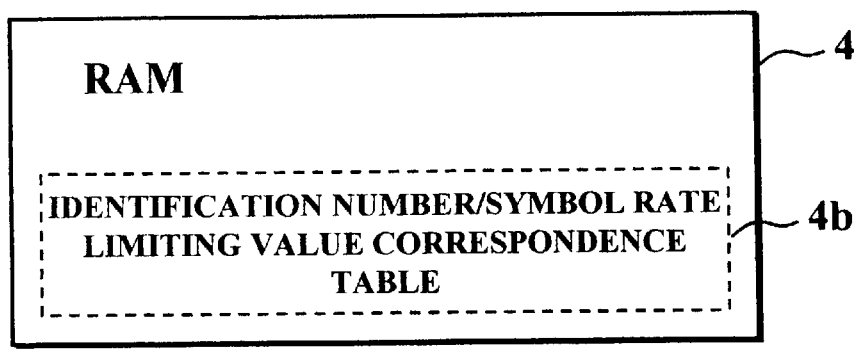
FIG. 11 is a diagram illustrating a storage area reserved in the RAM for an identification number/symbol rate limiting value correspondence table, in a second embodiment.
FIG. 12 is a table showing specific contents of the identification number/symbol rate limiting value correspondence table stored in the RAM in the second embodiment.

FIG. 12 shows specific contents of the identification number/symbol rate limiting value correspondence table 4b. Referring specifically to FIG. 12, the identification number/symbol rate limiting value correspondence table 4b is structured as a collection of records, each of which is composed of fields labeled "identification number" corresponding to a communication business entity and a "symbol rate limiting value" corresponding to each identification number, in a manner similar to the first embodiment. The contents of the identification number/symbol rate limiting value correspondence table 4b are registered through a similar procedure to the procedure for the one-touch call registration processing according to the first embodiment illustrated in FIGS. 8 and 9.

Next, a communication processing procedure according to the second embodiment will be described with reference to FIG. 13.

Figure 13:
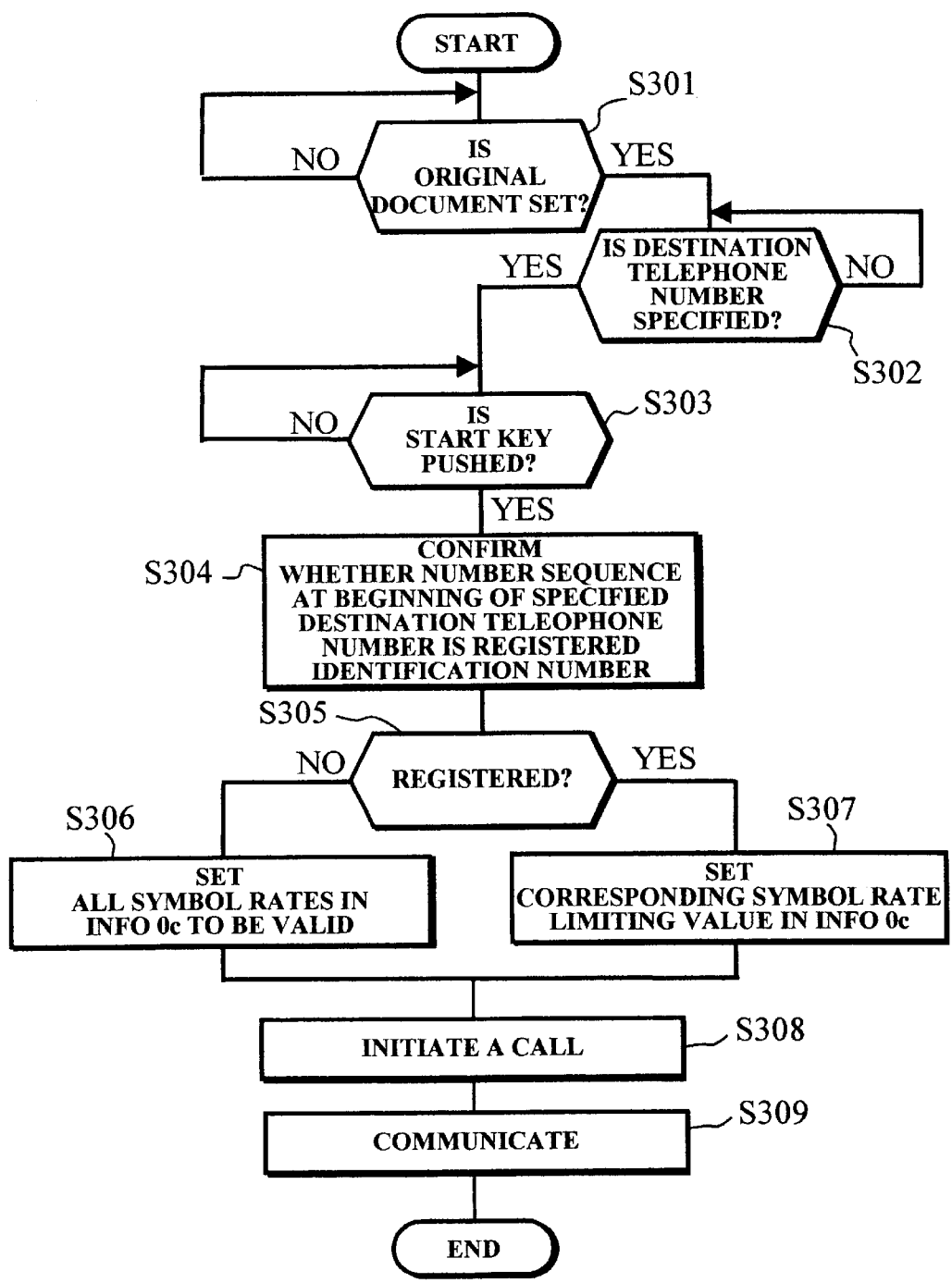
FIG. 13 is a flow chart illustrating a communication processing procedure according to the second embodiment.

Referring specifically to FIG. 13, the system controller 2 first monitors whether an original document has been set in the scanner 5 (a loop taking a No branch from decision step S301). As an original document is set in the scanner 5 (Yes at decision step S301), the system controller 2 monitors whether a destination telephone number has been specified by pushing a one-touch key, entry of a short number through the numeral keys 8a, or direct entry of a telephone number through the numeral keys 8a (a loop taking a No branch from decision step S302). When a destination telephone number is specified in any way (Yes at decision step S302), the system controller 2 monitors whether [Start] key 8b has been pushed for instructing the start of a communication loop (a loop taking a No branch from decision step S303).

When [Start] key 8b is eventually pushed to instruct the start of a communication (Yes at decision step S303), the system controller 2 confirms whether a number sequence at the beginning of the destination telephone number specified at decision step S302 is an identification number registered in the identification number/symbol rate limiting value correspondence table 4b of FIG. 12 (step S304).

When the number sequence is not a registered identification number (No at decision step S305), i.e., when the destination telephone number is not limited in symbol rate in relation to any identification number, the system controller 2 sets all of the available symbol rates in V.34 to be valid as symbol rates available to the facsimile apparatus 1 on the transmission side (step S306), which are notified to the reception side through INFO0c. Then, the facsimile apparatus 1 initiates a call to the destination telephone number specified at decision step S302 (step S308), and makes a communication with a reception side apparatus connected thereto through a line in accordance with the communication sequence illustrated in FIG. 5 (step S309).

Conversely, when the number sequence is a registered identification number (Yes at decision step S305), i.e., when the destination telephone number is limited in symbol rate in relation to the identification number, the system controller 2 sets only a combination of symbol rates specified by the symbol rate limiting value registered corresponding to the identification number to be valid as symbol rates available to the facsimile apparatus 1 (step S307), which are notified to the reception side through INFO0c. Then, the facsimile apparatus 1 initiates a call to the destination telephone number specified at decision step S302 (step S308), and makes a communication with the reception side apparatus connected thereto through the line in accordance with the communication sequence illustrated in FIG. 5 (step S309).

In the communication at step S309, which is made when decision step S305 results in Yes, since the combination of limited symbol rates registered corresponding to the identification number at the beginning of the destination telephone number specified at decision step S302 is notified to the reception side associated with the destination telephone number as a combination of symbol rates available to the facsimile apparatus 1, it is possible to avoid setting higher symbol rates exceeding the combination of the limited symbol rates, so that a communication can be made with optimal settings depending on the quality of a line between the facsimile apparatus 1 and each communication destination. The limitation to bit rates may be registered for each identification number corresponding to each communication business entity rather than for each destination telephone number, thereby providing a good operability.

Next, a third embodiment will be described. The third embodiment, which is a modification to the first embodiment, differs therefrom in that an additional processing procedure illustrated in FIG. 14 is performed subsequent to the step S211 in the communication processing procedure according to the first embodiment illustrated in FIG. 10.

Figure 14:
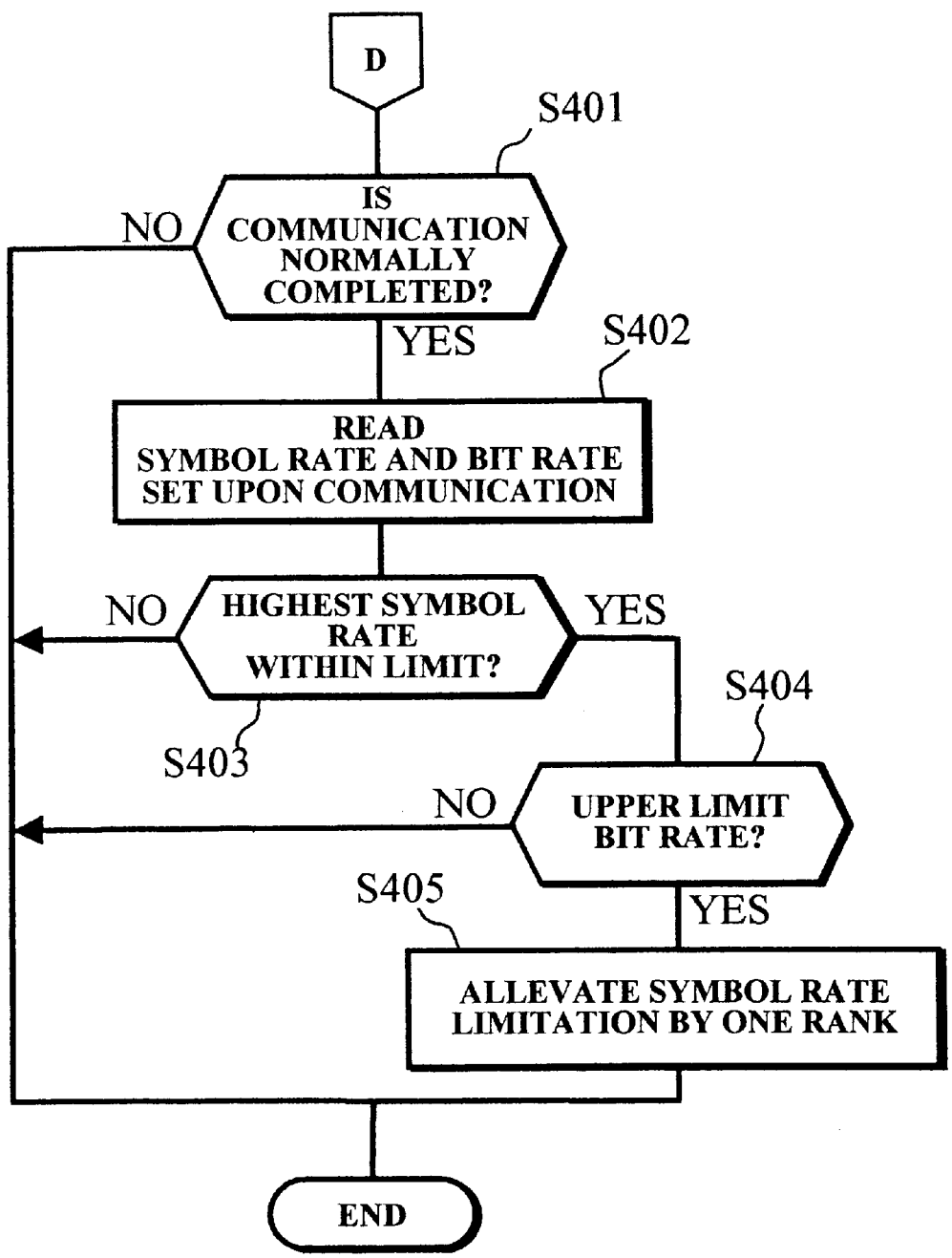
FIG. 14 is a flow chart illustrating a portion of a communication processing procedure according to a third embodiment.

Specifically, when the confirmation at step S204 shows that the limitation valid flag is set to "1" for a destination telephone number specified at step S202 in the communication processing procedure of FIG. 10 (Yes at decision step S205), the system controller 2 proceeds to decision step S401 in FIG. 14, after a combination of limited symbol rates has been notified to the reception side through INFO0c and a communication has been accordingly made at step S211. At step S401, the system controller 2 determines whether the communication at step S211 was normally completed without producing communication errors.

When the communication was not normally completed without producing communication errors (No at decision step S401), the system controller 2 terminates the processing of FIG. 14. Conversely, when the communication was normally completed (Yes at decision step S401), the system controller 2 reads the symbol rate and the bit rate which were set upon communication at step S211 (step S402). In the third embodiment, the symbol rate and the bit rate set at step S211 between the transmission side and the reception side are stored following step S402.

Then, the system controller 2 determines whether the symbol rate read at step S402 is the highest rate of the combination of limited symbol rates specified by the symbol rate limiting value corresponding to the destination telephone number specified at decision step S202 (decision step S403). When it is not the highest rate (No at decision step S403), the system controller 2 terminates the processing of FIG. 14. Conversely, when it is the highest rate (Yes at decision step S403), the system controller 2 determines whether the bit rate read at step S402 is an upper limit rate within a range of bit rates which can be set corresponding to the highest symbol rate determined at decision step S403, as previously shown in FIG. 1 (decision step S404). When it is not an upper limit rate (No at decision step S404), the system controller 2 terminates the processing of FIG. 14. Conversely, when it is an upper limit rate (Yes at decision step S404), the limitation to the symbol rates corresponding to the destination telephone number specified at decision step S202 is elevated by one rank (step S405).

Specifically, for example, when the destination telephone number specified at decision step S202 was entered by pushing a one-touch key "01" which corresponds to a telephone number "0011123456," the symbol rate limiting value is changed from "011001" before starting the communication processing, as shown in FIG. 7, to "111001" (FIG. 15) after the termination of the communication processing at step S405. In other words, within a range of a combination of symbol rates essentially available to the facsimile apparatus 1 (all symbol rates allowed by V.34), a symbol rate 3429, which is higher by one rank than the highest rate (in this case 3200) within the combination of limited symbol rates so far set, is included in a new combination of limited symbol rates.

Thus, when a communication was normally completed at the highest symbol rate and at the upper limit bit rate without producing any errors, i.e., when a normal communication is possibly accomplished even at a higher symbol rate, the communication terminal apparatus of the present invention can be flexibly adapted to a better communication environment.

Figures 15, 16:
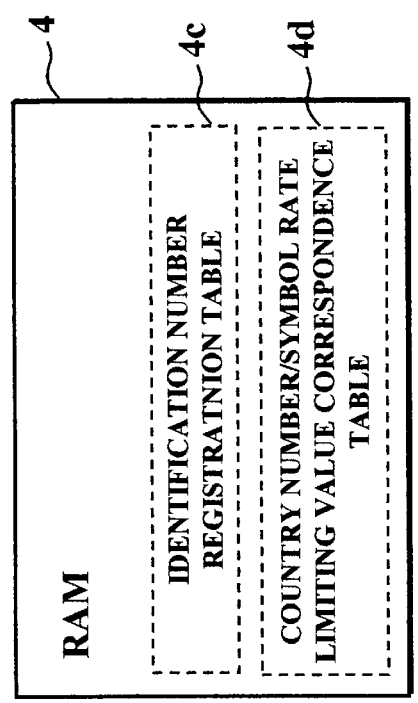
FIG. 15 is a table showing specific contents of the identification number/symbol rate limiting value correspondence table stored in the RAM in the third embodiment.
FIG. 16 is a diagram illustrating storage areas reserved in the RAM for an identification number registration table and a country number/symbol rate limiting value correspondence table in a fourth embodiment.

Next, a fourth embodiment will be described. In the fourth embodiment, storage areas are reserved in the RAM 4 for an identification number registration table 4c and a country number/symbol rate limiting value correspondence table 4d, as illustrated in FIG. 16.

FIG. 17 shows specific contents of the identification number registration table 4c. Referring specifically to FIG. 17, the table 4c is registered with identification numbers corresponding to communication business entities from which the facsimile apparatus 1 can be serviced. For initiating a foreign call with the facsimile apparatus 1, a destination telephone number is specified by first entering an identification number corresponding to a communication business entity through which a communication is to be made, entering a country number of the destination, and then entering the telephone number in the country.

FIG. 18 shows specific contents of the country number/ symbol rate limiting value correspondence table 4d. Referring specifically to FIG. 18, the country number/symbol rate limiting value correspondence table 4d is structured as a collection of records, each of which is composed of fields labeled "country number" and "symbol rate limiting value" corresponding to each country number. In the field "symbol rate limiting value," only symbol rates set at "1" are valid, and a symbol rate set at "0" means the rate is invalid.

Next, a communication processing procedure according to the fourth embodiment will be described with reference to FIG. 19.

Figure 19:
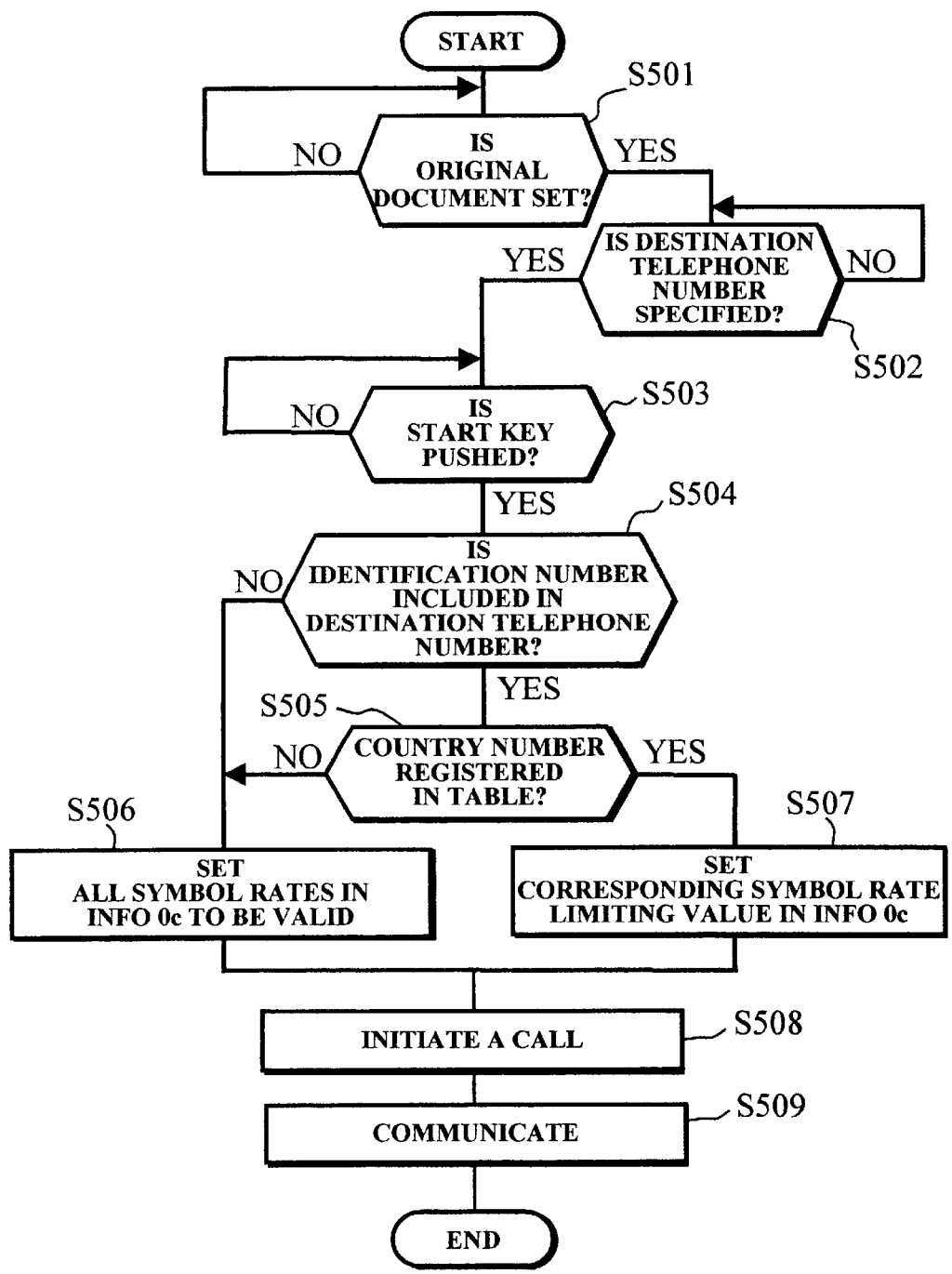
FIG. 19 is a flow chart illustrating a communication processing procedure according to the fourth embodiment.

Referring specifically to FIG. 19, the system control unit 2 first monitors whether an original document has been set in the scanner 5 (a loop taking a No branch from decision step S501). As an original document is set in the scanner 5 (Yes at decision step S501), the system controller 2 monitors whether a destination telephone number has been specified by pushing a one-touch key, entry of a short number through the numeral keys 8a, or direct entry of a telephone number through the numeral keys 8a (a loop taking a No branch from decision step S502). When a destination telephone number is specified in any way (Yes at decision step S502), the system controller 2 monitors whether [Start] key 8b has been pushed for instructing the start of a communication (a loop taking a No branch from decision step S503).

When [Start] key 8b is eventually pushed to instruct the start of a communication (Yes at decision step S503), the system controller 2 confirms whether a number sequence at the beginning of the destination telephone number specified at decision step S502 includes an identification number registered in the identification number registration table 4c of FIG. 16 (step S504).

When the number sequence includes a registered identification number (Yes at decision step S504), the system controller 2 confirms whether a number sequence subsequent to the identification number in the destination telephone number specified at decision step S502 represents a country number which has been registered in the country number/symbol rate limiting value correspondence table 4d (decision step S505).

Conversely, at decision step S504, when the number sequence at the beginning of the destination telephone number does not include a registered identification number (No at decision step S504), or when the number sequence at the beginning of the destination telephone number includes a registered identification number (Yes at decision step S504) but a subsequent number sequence does not represent a registered country number (No at decision step S505), i.e., when the destination telephone number is limited in symbol rate in relation to a country number subsequent to the identification number, the system controller 2 sets all of the available symbol rates in V.34 to be valid as symbol rates available to the facsimile apparatus 1 on the transmission side (step S506), which are notified to the reception side through INFO0c. Then, the facsimile apparatus 1 initiates a call to the destination telephone number specified at decision step S502 (step S508), and makes a communication with a reception side apparatus connected thereto through a line in accordance with the communication sequence illustrated in FIG. 5 (step S509).

When the number sequence at the beginning of the destination telephone number includes a registered identification number (Yes at decision step S504) and the subsequent number sequence represents a registered country number (Yes at decision step S505), i.e., when the destination telephone number is limited in symbol rate in relation to the country number subsequent to the identification number, the system controller 2 sets only a combination of symbol rates specified by the symbol rate limiting value registered corresponding to the country number to be valid as symbol rates available to the facsimile apparatus 1, which is notified to the reception side through INFO0c (step S507). Then, the facsimile apparatus 1 initiates a call to the destination telephone number specified at decision step S502 (step S508), and makes a communication with the reception side apparatus connected thereto through the line in accordance with the communication sequence illustrated in FIG. 5 (step S509).

In the communication at step S509, which is made when decision step S505 results in Yes, since the combination of limited symbol rates registered corresponding to the country number subsequent to the identification number at the beginning of the destination telephone number specified at decision step S502 is notified to the reception side associated with the destination telephone number as a combination of symbol rates available to the facsimile apparatus 1, it is possible to avoid setting higher symbol rates exceeding the combination of the limited symbol rates, so that a communication can be made with optimal settings depending on the quality of a line between the facsimile apparatus 1 and each communication destination. Also, the limitation to symbol rates can be registered for each of a plurality of country numbers corresponding to respective countries.

Figure 20:
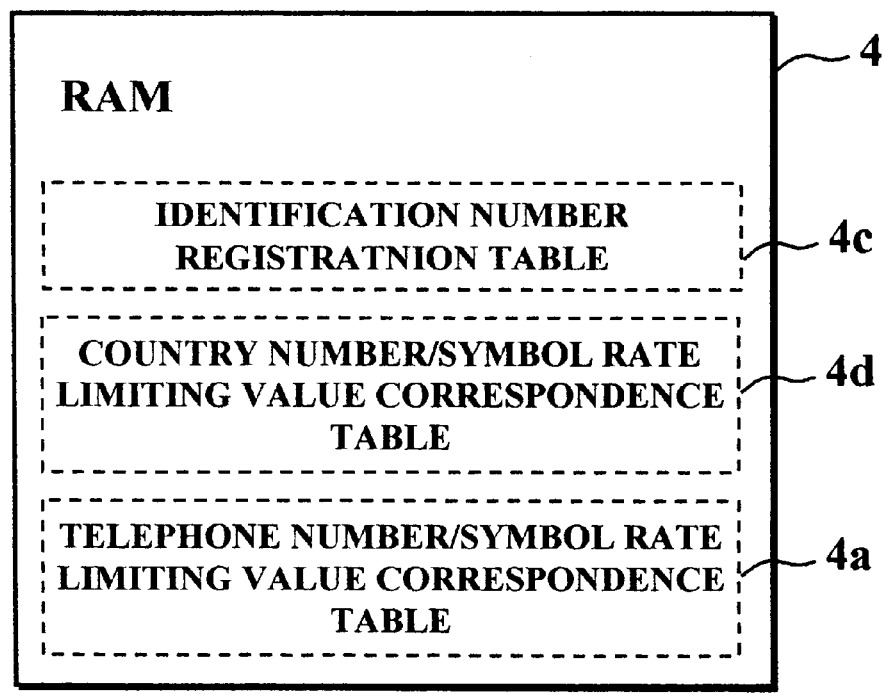
FIG. 20 is a diagram illustrating storage areas reserved in the RAM for the identification number registration table, the country number/symbol rate limiting value correspondence table, and the telephone number/symbol rate limiting value correspondence table in a fifth embodiment.

Next, a fifth embodiment will be described. In the fifth embodiment, storage areas are reserved in the RAM 4 for the identification number registration table 4c, the country number/symbol rate limiting value correspondence table 4d, and the telephone number/symbol rate limiting value correspondence table 4a, as illustrated in FIG. 20.

Specific contents of the identification number registration table 4c are as shown in FIG. 17, and specific contents of the country number/symbol rate limiting value correspondence table 4d are as shown in FIG. 18. Also, specific contents of the telephone number/symbol rate limiting value correspondence table 4a are as shown in FIG. 7, and registered through the registration procedure illustrated in FIGS. 8 and 9.

Figure 21:
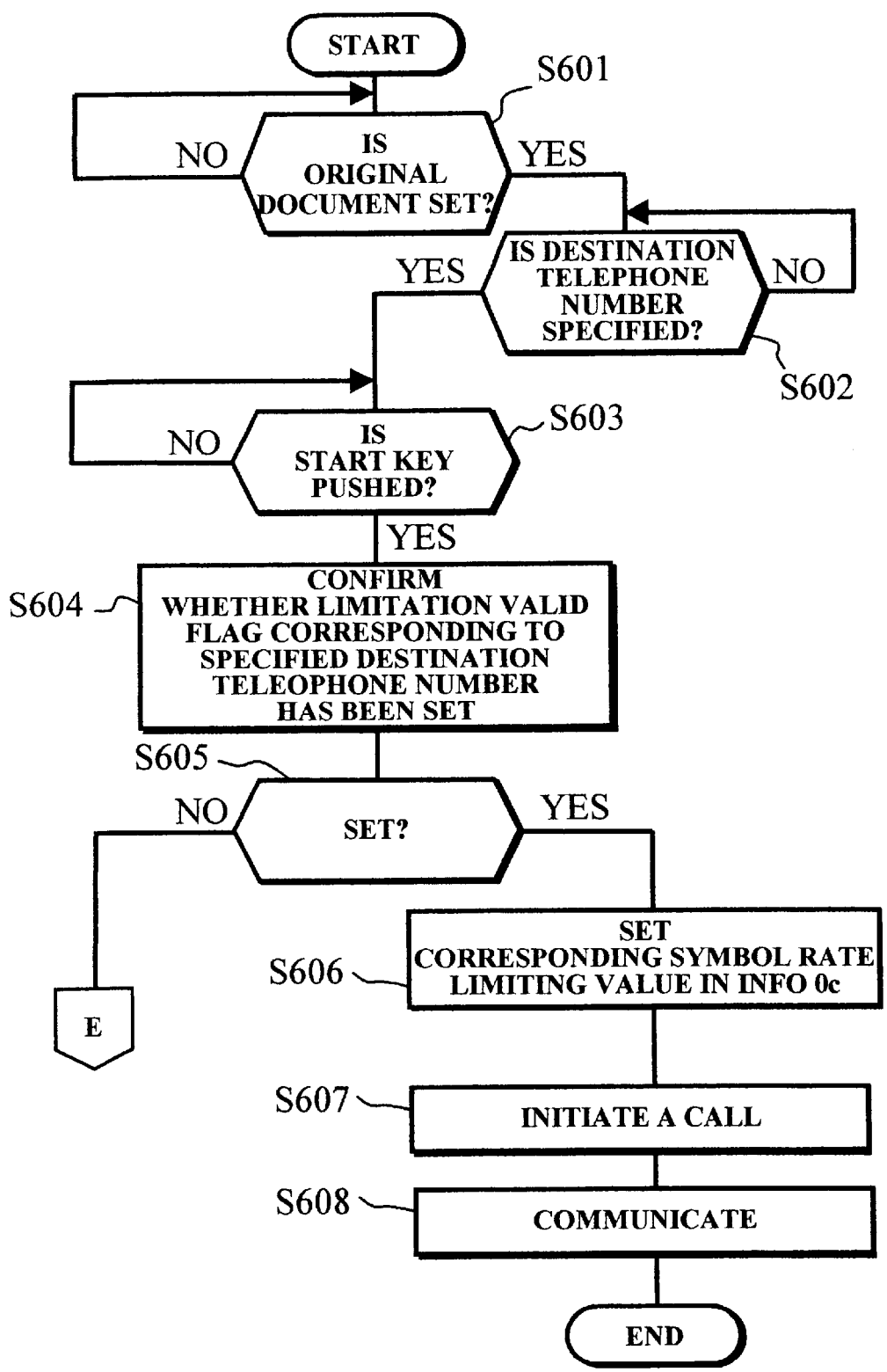
FIG. 21 is a flow chart illustrating a communication processing procedure according to the fifth embodiment.
Figure 22:
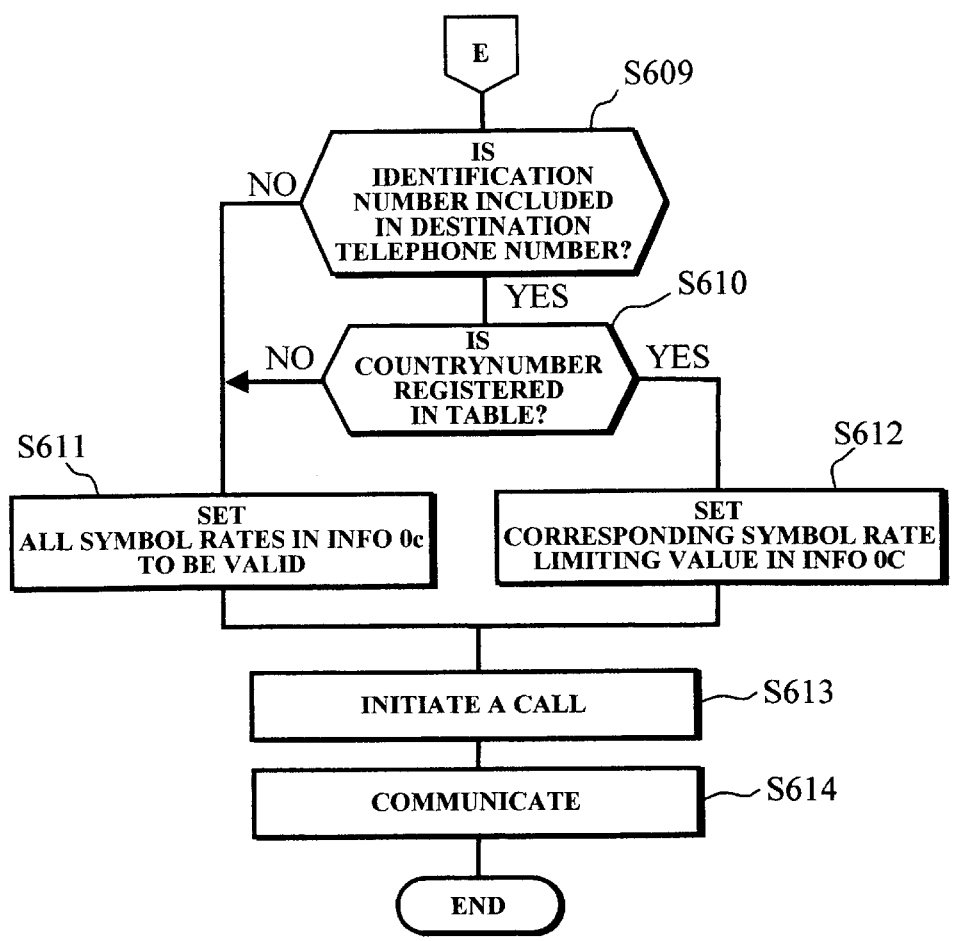
FIGS. 22 and 23 are flow charts illustrating in combination a communication processing procedure according to the fifth embodiment.

Next, a communication processing procedure according to the fifth embodiment will be described with reference to FIGS. 21 and 22. Referring specifically to FIGS. 21 and 22, the system controller 2 first monitors whether an original document has been set in the scanner 5 (a loop taking a No branch from decision step S601). As an original document is set in the scanner 5 (Yes at decision step S601), the system controller 2 monitors whether a destination telephone number has been specified by pushing a one-touch key, entry of a short number through the numeral keys 8a, or direct entry of a telephone number through the numeral keys 8a (a loop taking a No branch from decision step S602). When a destination telephone number is specified in any way (Yes at decision step S602), the system controller 2 monitors whether [Start] key 8b is pushed for instructing the start of a communication (a loop taking a No branch from decision step S603).

When [Start] key 8b is eventually pushed to instruct the start of a communication (Yes at decision step S603), the system controller 2 confirms, with reference to the telephone number/symbol rate limiting value correspondence table 4a, whether the limitation valid flag corresponding to the destination telephone number specified at decision step S602 has been set (step S604). Specifically, for example, when the destination telephone number is specified by pushing a one-touch key at decision step S602, the system controller 2 looks up the limitation valid flag corresponding to a telephone number associated with the one-touch number in the telephone number/symbol rate limiting value correspondence table 4a of FIG. 7, and confirms whether the limitation valid flag is set.

When the limitation valid flag is not set (No at decision step S605), the system controller 2 proceeds to decision step S609. Conversely, when the limitation valid flag has been set (Yes at decision step S605), i.e., when the destination telephone number is limited in symbol rate, the system controller 2 sets only a combination of symbol rates specified by the symbol rate limiting value registered corresponding to the destination telephone number to be valid as symbol rates available to the facsimile apparatus 1 on the transmission side (step S606), which are notified to the reception side through INFO0c. Then, the facsimile apparatus 1 initiates a call to the destination telephone number specified at decision step S602 (step S607), and makes a communication with a reception side apparatus connected thereto through a line in accordance with the communication sequence illustrated in FIG. 5 (step S608).

At decision step S605, when the limitation valid flag is not set corresponding to the telephone number associated with the specified one-touch button (No at decision step S605), the system controller 2 confirms whether a number sequence at the beginning of the destination telephone number specified at decision step S602 includes an identification number registered in the identification number registration table 4c (decision step S609 in FIG. 22).

When the number sequence includes a registered identification number (Yes at decision step S609), the system controller 2 confirms whether a number sequence subsequent to the identification number in the destination telephone number specified at decision step S602 represents a country number which has been registered in the country number/symbol rate limiting value correspondence table 4d (decision step S610).

Conversely, at decision step S609, when the number sequence at the beginning of the destination telephone number does not include a registered identification number (No at decision step S609), or when the number sequence at the beginning of the destination telephone number includes a registered identification number (Yes at decision step S609) but the subsequent number sequence does not represent a registered country number (No at decision step S610), i.e., when the destination telephone number is not limited in symbol rate in relation to itself or the country number subsequent to the identification number, the system controller 2 sets all of the available symbol rates in V.34 to be valid as symbol rates available to the facsimile apparatus 1 on the transmission side (step S611), which are notified to the reception side through INFO0c. Then, the facsimile apparatus 1 initiates a call to the destination telephone number specified at decision step S602 (step S613), and makes a communication with a reception side apparatus connected thereto through a line in accordance with the communication sequence illustrated in FIG. 5 (step S614).

When the number sequence at the beginning of the destination telephone number includes a registered identification number (Yes at decision step S609) and the subsequent number sequence represents a registered country number (Yes at decision step S610), i.e., when the destination telephone number is limited in symbol rate in relation to the country number subsequent to the identification number, the system controller 2 sets only a combination of symbol rates specified by the symbol rate limiting value registered corresponding to the country number to be valid as symbol rates available to the facsimile apparatus 1 (step S612), which are notified to the reception side through INFO0c. Then, the facsimile apparatus 1 initiates a call to the destination telephone number specified at decision step S602 (step S613), and makes a communication with the reception side apparatus connected thereto through the line in accordance with the communication sequence illustrated in FIG. 5 (step S614).

In the communication at step S608, which is made when decision step S605 results in Yes, the combination of limited symbol rates registered corresponding to the destination telephone number is preferentially notified to the reception side associated with the destination telephone number specified at decision step S602 as a combination of symbol rates available to the facsimile apparatus 1. Also, in the communication at step S614, which is made when decision step S610 results in Yes, the combination of limited symbol rates registered corresponding to the country number subsequent to the identification number at the beginning of the destination telephone number specified at decision step S602 is notified to the reception side associated with the destination telephone number as a combination of symbol rates available to the facsimile apparatus 1. It is therefore possible to avoid setting higher symbol rates exceeding the combination of the limited symbol rates notified to the reception side, so that a communication can be made with optimal settings depending on the quality of a line between the facsimile apparatus 1 and each communication destination. Also, the combination of limited symbol rates notified to the reception side, registered corresponding to the destination telephone number itself can be selected with a higher priority to the combination of limited symbol rates registered corresponding to the country number.

Figure 23:
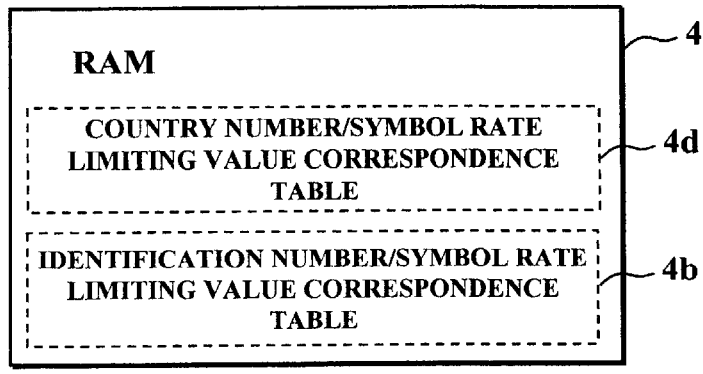

Next, a sixth embodiment will be described. In the sixth embodiment, storage areas are reserved in the RAM 4 for the country number/symbol rate limiting value correspondence table 4d and the identification number/symbol rate limiting value correspondence table 4b, as illustrated in FIG. 23.

Specific contents of the country number/symbol rate limiting value correspondence table 4d are as shown in FIG. 18, while specific contents of the identification number/symbol rate limiting value correspondence table 4b are as shown in FIG. 12.

Next, a communication processing procedure according to the sixth embodiment will be described with reference to FIGS. 24 and 25.

Figure 24:
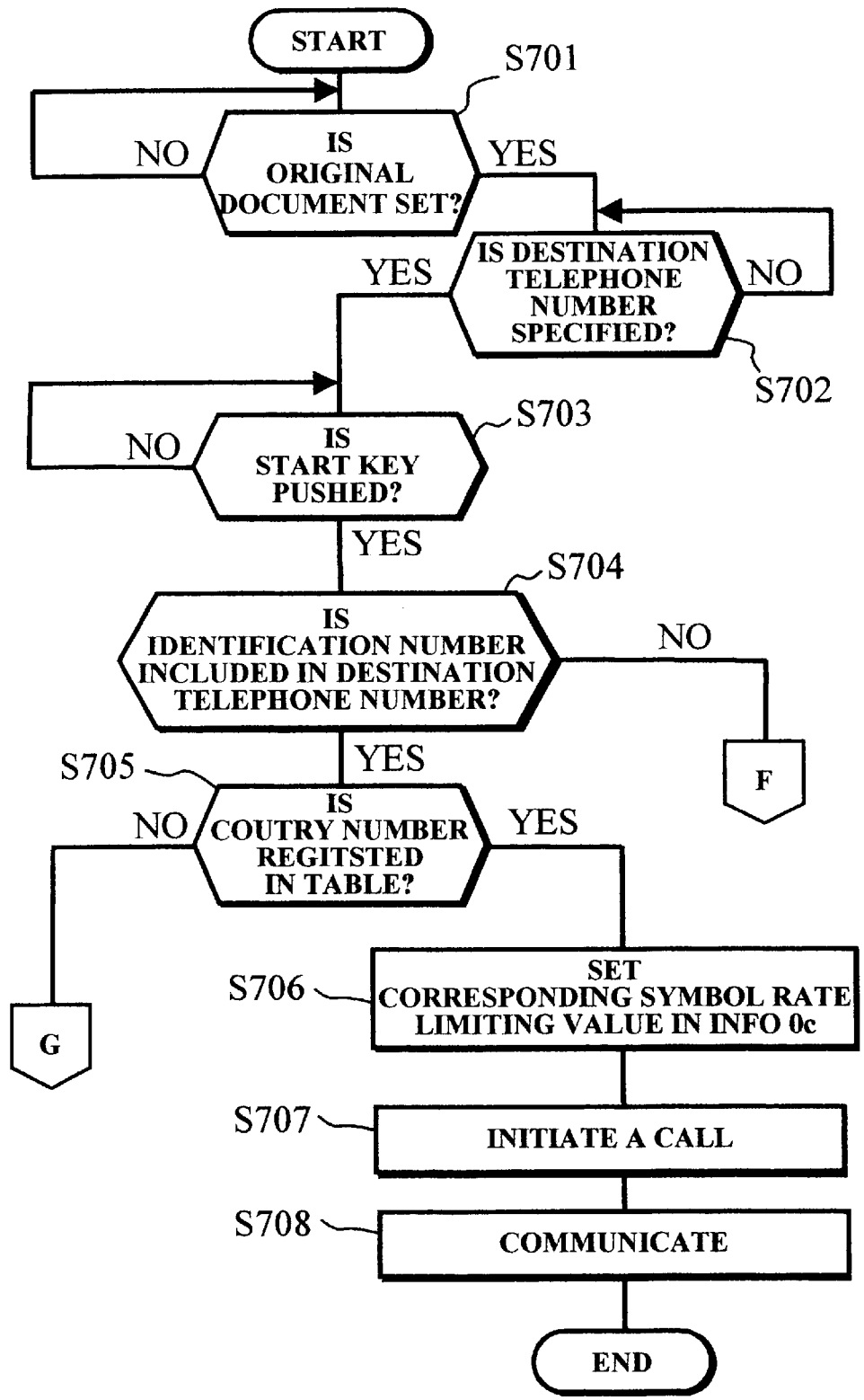
FIGS. 24 and 25 are flow charts illustrating in combination a communication processing procedure according to the sixth embodiment.
Figure 25:
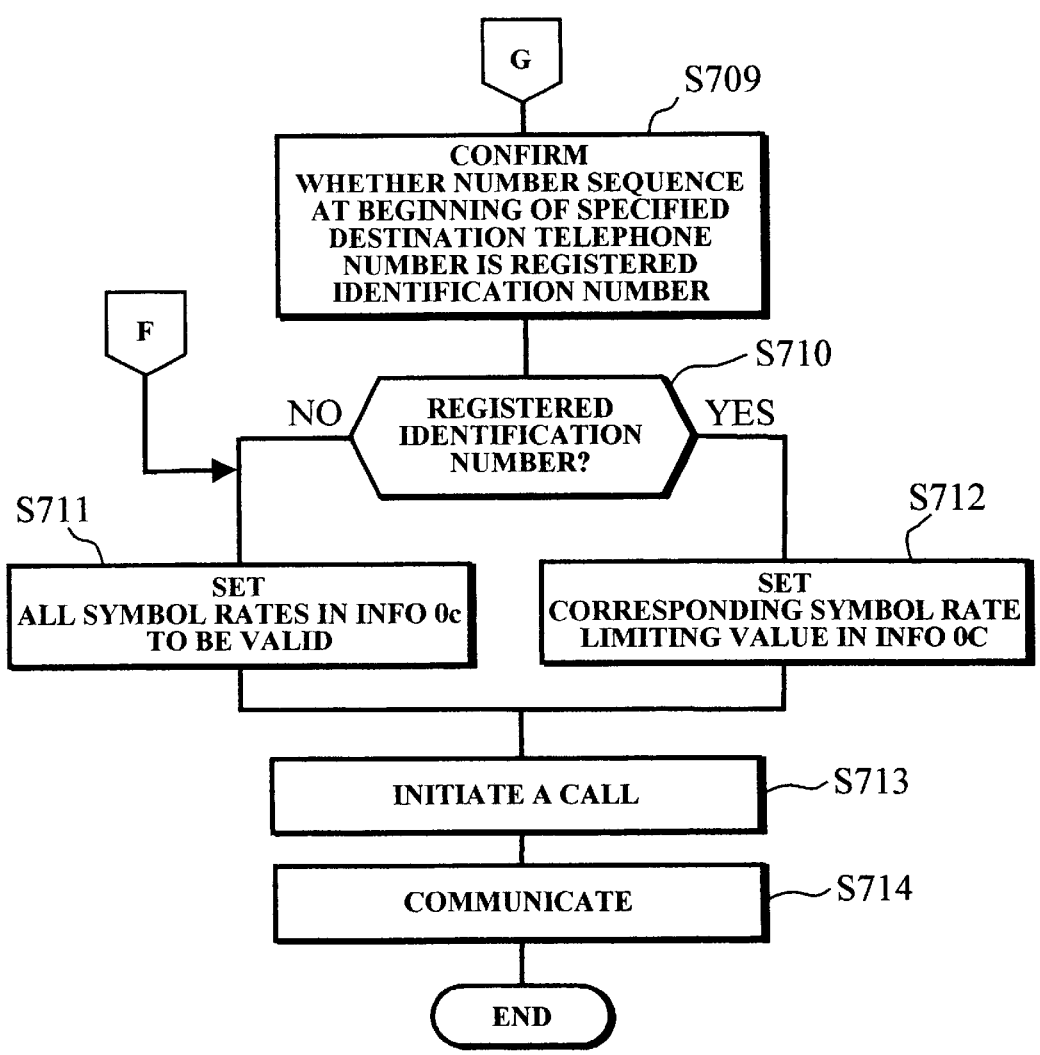

Referring specifically to FIGS. 24 and 25, the system controller 2 first monitors whether an original document has been set in the scanner 5 (a loop taking a No branch from decision step S701). As an original document is set in the scanner 5 (Yes at decision step S701), the system controller 2 monitors whether a destination telephone number has been specified using a one-touch key, entry of a short number through the numeral keys 8a, or direct entry of a telephone number through the numeral keys 8a (a loop taking a No branch from decision step S702). When a destination telephone number is specified in any way (Yes at decision step S702), the system controller 2 monitors whether [Start] key 8b is pushed for instructing the start of a communication (a loop taking a No branch from decision step S703).

When [Start] key 8b is eventually pushed to instruct the start of a communication (Yes at decision step S703), the system controller 2 confirms whether a number sequence at the beginning of the destination telephone number specified at decision step S702 includes an identification number registered in the identification number/symbol rate limiting value correspondence table 4b (step S704).

When the number sequence does not include a registered identification number (No at decision step S704), the system controller 2 proceeds to step S711. Conversely, when the number sequence includes a registered identification number (Yes at decision step S704), the system controller 2 further confirms whether a number sequence subsequent to the identification number in the destination telephone number specified at decision step S702 represents a country number which has been registered in the country number/symbol rate limiting value correspondence table 4d (decision step S705).

When the destination telephone number includes a registered identification number (Yes at decision step S704), and the subsequent number sequence represents a registered country number (Yes at decision step S705), i.e., when the destination telephone number is limited in symbol rate in relation to the country number subsequent to the identification number, the system controller 2 sets only a combination of symbol rates specified by the symbol rate limiting value registered corresponding to the country number to be valid as symbol rates available to the facsimile apparatus 1 (step S706), which are notified to the reception side through INFO0c. Then, the facsimile apparatus 1 initiates a call to the destination telephone number specified at decision step S702 (step S707), and makes a communication with the reception side apparatus connected thereto through the line in accordance with the communication sequence illustrated in FIG. 5 (step S708).

When the destination telephone number includes a registered identification number (Yes at decision step S704) but the subsequent number sequence does not represent a registered country number (No at decision step S705), i.e., when the destination telephone number is not limited in symbol rate in relation to the country number subsequent to the identification number, the system controller 2 confirms whether a number sequence at the beginning of the destination telephone number specified at decision step S702 is an identification number registered in the identification number/symbol rate limiting value correspondence table 4b (step S709 in FIG. 25). When the number sequence is a registered identification number (Yes at decision step S710), the system controller 2 sets only a combination of symbol rates specified by the symbol rate limiting value registered corresponding to the identification number to be valid as symbol rates available to the facsimile apparatus 1 (step S712), which are notified to the reception side through INFO0c. Then, the facsimile apparatus 1 initiates a call to the destination telephone number specified at decision step S702 (step S713), and makes a communication with the reception side apparatus connected thereto through the line in accordance with the communication sequence illustrated in FIG. 5 (step S714).

At decision step S704, when the destination telephone number does not include a registered identification number (No at decision step S704), or when the destination telephone number includes a registered identification number (Yes at decision step S704) but the subsequent number sequence does not represent a registered country number (No at decision step S705) so that the destination telephone number is not limited in symbol rate in relation to the identification number (No at decision step S710), the system controller 2 sets all of the available symbol rates in V.34 to be valid (step S711). Then, the facsimile apparatus 1 initiates a call to the destination telephone number specified at decision step S702 (step S713), and makes a communication with a reception side apparatus connected thereto through a line in accordance with the communication sequence illustrated in FIG. 5 (step S714).

In the communication at step S708, which is made when decision step S705 results in Yes, the combination of limited symbol rates registered corresponding to the country number included in the destination telephone number is preferentially notified to the reception side associated with the destination telephone number specified at decision step S702 as a combination of symbol rates available to the facsimile apparatus 1. Also, in the communication at step S714, which is made when decision step S710 results in Yes, the combination of limited symbol rates registered corresponding to the identification number at the beginning of the destination telephone number specified at decision step S702 is notified to the reception side associated with the destination telephone number as a combination of symbol rates available to the facsimile apparatus 1. It is therefore possible to avoid setting higher symbol rates exceeding the combination of the limited symbol rates notified to the reception side, so that a communication can be made with optimal settings depending on the quality of a line between the facsimile apparatus 1 and each communication destination. Also, the combination of limited symbol rates notified to the reception side, registered corresponding to the country number, can be selected with a higher priority to the combination of limited symbol rates registered corresponding to the identification number.

Next, a seventh embodiment will be described. The seventh embodiment is similar to the sixth embodiment in that storage areas are reserved in the RAM 4 for the country number/symbol rate limiting value correspondence table 4d and the identification number/symbol rate limiting value correspondence table 4b, as illustrated in FIG. 23.

Specific contents of the country number/symbol rate limiting value correspondence table 4d are as shown in FIG. 18, while specific contents of the identification number/symbol rate limiting value correspondence table 4b are as shown in FIG. 12.

Next, a communication processing procedure according to the seventh embodiment will be described with reference to FIGS. 26 and 27.

Figure 26:
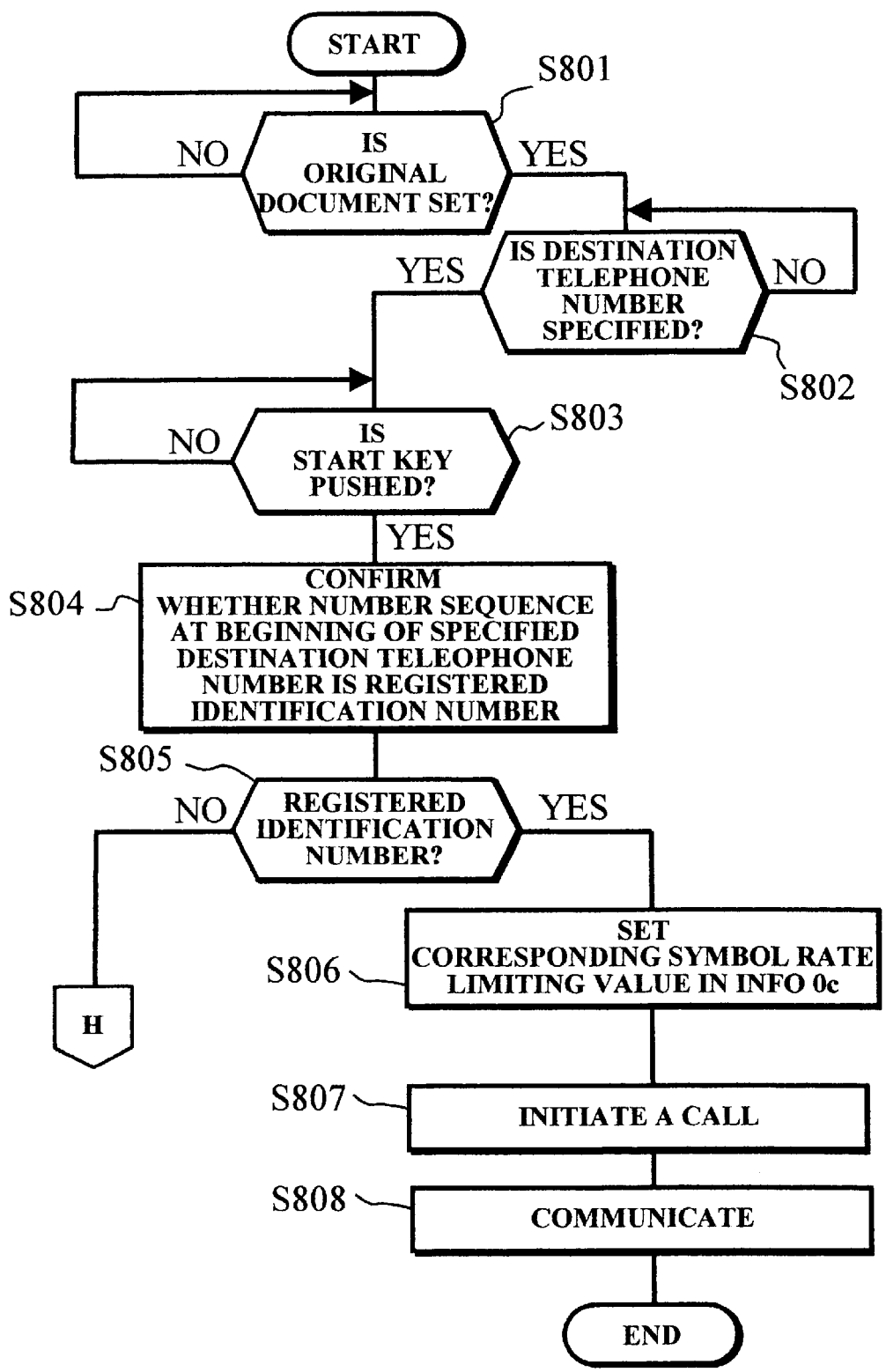
FIGS. 26 and 27 are flow charts illustrating in combination a communication processing procedure according to the seventh embodiment.
Figure 27:
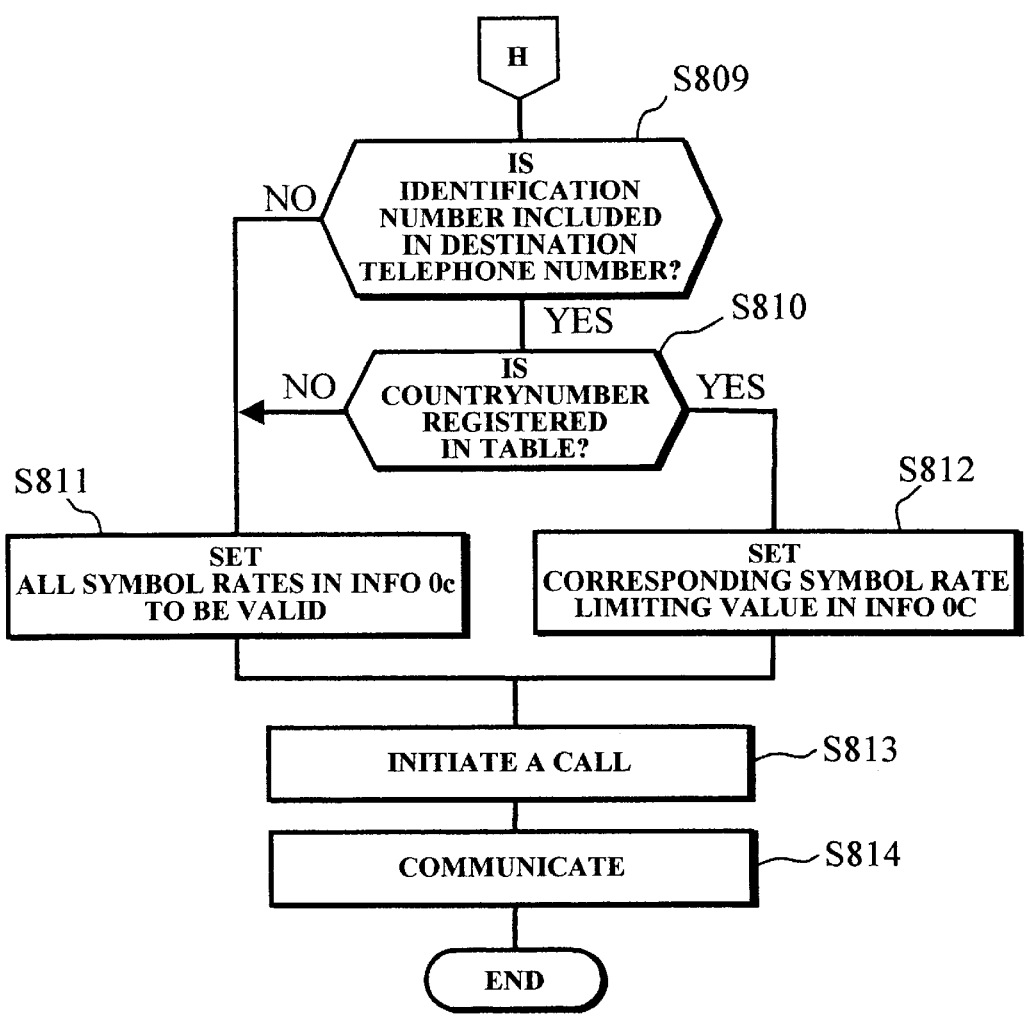

Referring specifically to FIGS. 26 and 27, the system controller 2 first monitors whether an original document has been set in the scanner 5 (a loop taking a No branch from decision step S801). As an original document is set in the scanner 5 (Yes at decision step S801), the system controller 2 monitors whether a destination telephone number has been specified using a one-touch key, entry of a short number through the numeral keys 8a or direct entry of a telephone number through the numeral keys 8a (a loop taking a No branch from decision step S802). When a destination telephone number is specified in any way (Yes at decision step S802), the system controller 2 monitors whether [Start] key 8b is pushed for instructing the start of a communication (a loop taking a No branch from decision step S803).

When [Start] key 8b is eventually pushed to instruct the start of a communication (Yes at decision step S803), the system controller 2 confirms whether a number sequence at the beginning of the destination telephone number specified at decision step S802 is an identification number registered in the identification number/symbol rate limiting value correspondence table 4b (step S804). When the number sequence is a registered identification number (Yes at decision step S805), the system controller 2 sets only a combination of symbol rates specified by the symbol rate limiting value registered corresponding to the identification number to be valid as symbol rates available to the facsimile apparatus 1 (step S806), which are notified to the reception side through INFO0c. Then, the facsimile apparatus 1 initiates a call to the destination telephone number specified at decision step S802 (step S807), and makes a communication with the reception side apparatus connected thereto through the line in accordance with the communication sequence illustrated in FIG. 5 (step S808).

When the number sequence is not a registered identification number (No at decision step S805), the system controller 2 confirms whether an identification number is included at the beginning of the destination telephone number specified at decision step S802 (decision step S809 in FIG. 27). When no identification number is included (No at decision step S809), the system controller 2 proceeds to step S811. Conversely, when an identification number is included (Yes at decision step S809), the system controller 2 further confirms whether a number sequence subsequent to the identification number in the destination telephone number specified at decision step S802 represents a country number which has been registered in the country number/symbol rate limiting value correspondence table 4d (decision step S810).

When the destination telephone number includes a registered identification number (Yes at decision step S809), and the subsequent number sequence represents a registered country number (Yes at decision step S810), i.e., when the destination telephone number is limited in symbol rate in relation to the country number subsequent to the identification number, the system controller 2 sets only a combination of symbol rates specified by the symbol rate limiting value registered corresponding to the country number to be valid as symbol rates available to the facsimile apparatus 1 (step S812), which are notified to the reception side through INFO0c. Then, the facsimile apparatus 1 initiates a call to the destination telephone number specified at decision step S802 (step S813), and makes a communication with the reception side apparatus connected thereto through the line in accordance with the communication sequence illustrated in FIG. 5 (step S814).

When the destination telephone number includes a registered identification number (Yes at decision step S809) but the subsequent number sequence does not represent a registered country number (No at decision step S810), i.e., when the destination telephone number is not limited in symbol rate in relation to either the identification number or the country number subsequent to the identification number, the system controller 2 sets all of the available symbol rates in V.34 to be valid (step S811). Then, the facsimile apparatus 1 initiates a call to the destination telephone number specified at decision step S802 (step S813), and makes a communication with the reception side apparatus connected thereto through the line in accordance with the communication sequence illustrated in FIG. 5 (step S814).

In the communication at step S808, which is made when decision step S805 results in Yes, the combination of limited symbol rates registered corresponding to the identification number at the beginning of the destination telephone number specified at step S802 is preferentially notified to the reception side associated with the destination telephone number as a combination of symbol rates available to the facsimile apparatus 1. Also, in the communication at step S814, which is made when decision step S810 results in Yes, the combination of limited symbol rates registered corresponding to the country number included in the destination telephone number specified at decision step S802 is notified to the reception side associated with the destination telephone number as a combination of symbol rates available to the facsimile apparatus 1. It is therefore possible to avoid setting higher symbol rates exceeding the combination of the limited symbol rates notified to the reception side, so that a communication can be made with optimal settings depending on the quality of a line between the facsimile apparatus 1 and each communication destination. Also, the combination of limited symbol rates notified to the reception side, registered corresponding to the identification number can be selected with a higher priority to the combination of limited symbol rates registered corresponding to the country number.

According to the embodiments of the present invention so far described, the quality of communication can be improved for overseas communications as well as for a communication with a destination in a bad line situation, by finely adjusting the bit rate and the symbol rate in accordance with line conditions.

While in the embodiments described above, the present invention is applied to a facsimile apparatus representative of the communication terminal apparatus for communicating a facsimile message as communication data, the present invention may also be applied likewise to a variety of other communication terminal apparatuses for communicating data. In addition, a modem for use with the present invention is not limited to that conforming to the V.34 standard, but a modem conforming to any other standard may be used instead.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations of the present invention are possible in light of the above teachings. It is therefore to be understood that within the scope of the appended claims, the present invention may be practiced otherwise than as specifically described herein.

This document is based on Japanese Patent Application Nos. JPAP10-118405 filed on Apr. 28, 1998, and JPAP10-258029 filed on Sep. 11, 1998, in the Japanese Patent Office, the entire contents of which are hereby incorporated by reference.

What is claimed is:

1. A communication terminal apparatus adapted to notify a reception side apparatus, connected thereto in response to a call made by said communication terminal apparatus through a line to a specified destination telephone number entered to said communication terminal apparatus, of at least information identifying a combination of symbol rates available to said communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication terminal apparatus comprising:

a telephone number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of destination telephone numbers; and communication control means responsive to a specified destination telephone number entered to said communication terminal apparatus upon initiating a call, to determine whether said specified destination telephone number is limited in symbol rate, by reference to said telephone number/limited symbol rate correspondence table, said communication control means being operative, when determining that said specified destination telephone number is limited in symbol rate, to notify said reception side apparatus of a corresponding combination of limited symbol rates as information identifying a combination of symbol rates available to said communication terminal apparatus to make a communication with said reception side apparatus.

2. A communication terminal apparatus adapted to notify a reception side apparatus, connected thereto in response to a call made by said communication terminal apparatus through a line to a specified destination telephone number entered to said communication terminal apparatus, of at least information identifying a combination of symbol rates available to said communication terminal apparatus from among a plurality of symbol rates defined by a predetermined communication standard, to communicate with said reception side apparatus at a symbol rate and a bit rate determined by said reception side apparatus based identifying the notified information identifying the combination of symbol rates and the characteristics of said line connected thereto, said communication terminal apparatus comprising:

an identification number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of identification numbers; and communication control means responsive to a specified destination telephone number entered to said communication terminal apparatus upon initiating a call, to determine whether a number sequence at a beginning of said specified destination telephone number is coincident with an identification number which is limited in symbol rate, reference to said identification number/limited symbol rate correspondence table, said communication control means being operative, when determining that said identification number is limited in symbol rate to notify said reception side apparatus of a corresponding combination of limited symbol rates as information identifying the combination of symbol rates available to said communication terminal apparatus to make a communication with said reception side apparatus.

3. A communication terminal apparatus according to claim 1, further comprising:

communication state detecting means for detecting a symbol rate and a bit rate determined by said reception side apparatus and used to actually make a communication between said communication terminal apparatus and said reception side apparatus, said reception side apparatus being connected through said communication control means to said communication terminal apparatus through a line in response to a call made by said communication terminal apparatus to a destination telephone number stored in said telephone number/limited symbol rate correspondence table; and symbol rate limitation elevating means responsive to a symbol rate detected by said communication state detecting means after the communication has been normally completed without producing errors, wherein when said detected symbol rate is a highest one of symbol rates included in the combination of limited symbol rates stored in said telephone number/limited symbol rate correspondence table corresponding to said destination telephone number, and when a bit rate detected by said communication state detecting means is an upper limit bit rate which can be set at said highest symbol rate, said symbol rate limitation elevating means additionally sets a symbol rate one rank higher than said highest symbol rate within the combination of symbol rates essentially available to said communication terminal apparatus as the combination of limited symbol rates stored in said telephone number/limited symbol rate correspondence table corresponding to said destination telephone number.

4. A communication terminal apparatus adapted to notify a reception side apparatus, connected thereto in response to a call made by said communication terminal apparatus through a line to a specified destination telephone number entered to said communication terminal apparatus, of at least information identifying a combination of symbol rates available to said communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication terminal apparatus comprising:

an identification number registration table for storing previously registered identification numbers;

a country number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of country numbers; and communication control means responsive to a specified destination telephone number entered to said communication terminal apparatus upon initiating a call, to reference said identification number registration table and said country number/limited symbol rate correspondence table, said communication control means being operative when a number sequence at a beginning of said specified destination telephone number has been registered as an identification number in said identification number registration table, and when a number sequence subsequent to said identification number in said destination telephone number represents a country number registered in said country number/limited symbol rate correspondence table, to notify said reception side apparatus of a combination of limited symbol rates corresponding to said country number, as information identifying the combination of symbol rates available to said communication terminal apparatus to make a communication with said reception side apparatus.

5. A communication terminal apparatus adapted to notify a reception side apparatus, connected thereto in response to a call made by said communication terminal apparatus through a line to a specified destination telephone number entered to said communication terminal apparatus, of at least information identifying a combination of symbol rates available to said communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication terminal apparatus comprising:

a telephone number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of destination telephone numbers;

an identification number registration table for storing previously registered identification numbers;

a country number/limited symbol rate correspondence table for storing a combination of limited symbol rates set by selecting at least a portion of the combination of symbol rates essentially available to said communication terminal apparatus, said combination of limited symbol rates being stored corresponding to each of a plurality of country numbers; and communication control means responsive to a specified destination telephone number entered to said communication terminal apparatus upon initiating a call, to reference said telephone number/limited symbol rate correspondence table, said identification number registration table and said country number/limited symbol rate correspondence table, wherein said communication control means is operative, when said specified destination telephone number is registered in said telephone number/limited symbol rate correspondence table, to notify said reception side apparatus of a combination of limited symbol rates corresponding to said destination telephone number as information identifying a combination of symbol rates available to said communication terminal apparatus to make a communication with said reception side apparatus, and wherein said communication control means is further operative when said specified destination telephone number is not registered in said telephone number/limited symbol rate correspondence table, and when a number sequence at a beginning of said specified destination telephone number has been registered as an identification number in said identification number registration table and when a number sequence subsequent to said identification number in said destination telephone number represents a country number registered in said country number/limited symbol rate correspondence table, to notify said reception side apparatus of a combination of limited symbol rates corresponding to said country number, as information identifying a combination of symbol rates available to said communication terminal apparatus to make a communication with said reception side apparatus.

6. A communication terminal apparatus adapted to notify a reception side apparatus, connected thereto in response to a call made by said communication terminal apparatus through a line to a specified destination telephone number entered to said communication terminal apparatus, of at least information identifying a combination of symbol rates available to said communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication terminal apparatus comprising:

an identification number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of identification numbers;

a country number/limited symbol rate correspondence table for storing a combination of limited symbol rates set by selecting at least a portion of the combination of symbol rates essentially available to said communication terminal apparatus, said combination of limited symbol rates being stored corresponding to each of a plurality of country numbers; and communication control means responsive to a specified destination telephone number entered to said communication terminal apparatus upon initiating a call, to reference said identification number/limited symbol rate correspondence table and said country number/limited symbol rate correspondence table, wherein when a number sequence at a beginning of said destination telephone number has been registered as an identification number in said identification number/limited symbol rate correspondence table, wherein said communication control means is operative, when a number sequence subsequent to said identification number in said destination telephone number represents a country number registered in said country number/limited symbol rate correspondence table, to notify said reception side apparatus of a combination of limited symbol rates corresponding to said country number, as information identifying a combination of symbol rates available to said communication terminal apparatus, to make a communication with said reception side apparatus and, when said number sequence subsequent to said identification number in said destination telephone number does not represent a country number registered in said country number/limited symbol rate correspondence table, to notify said reception side apparatus of a combination of limited symbol rates corresponding to said identification number, as information identifying a combination of symbol rates available to said communication terminal apparatus to make a communication with said reception side apparatus.

7. A communication terminal apparatus adapted to notify a reception side apparatus, connected thereto in response to a call made by said communication terminal apparatus through a line to a specified destination telephone number entered to said communication terminal apparatus, of at least information identifying a combination of symbol rates available to said communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication terminal apparatus comprising:

an identification number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of identification numbers;

a country number/limited symbol rate correspondence table for storing a combination of limited symbol rates set by selecting at least a portion of the combination of symbol rates essentially available to said communication terminal apparatus, said combination of limited symbol rates being stored corresponding to each of a plurality of country numbers; and communication control means responsive to a specified destination telephone number entered to said communication terminal apparatus upon initiating a call, to reference said identification number/limited symbol rate correspondence table and said country number/limited symbol rate correspondence table, said communication control means being operative when a number sequence at a beginning of said destination telephone number has been registered as an identification number in said identification number/limited symbol rate correspondence table, to notify said reception side apparatus of a combination of limited symbol rates corresponding to said identification number, as information identifying a combination of symbol rates available to said communication terminal apparatus to make a communication with said reception side apparatus, and said communication control means being further operative when the number sequence at the beginning of said destination telephone number is not registered as an identification number in said identification number/limited symbol rate correspondence table, and when a number sequence subsequent to said identification number in said destination telephone number represents a country number registered in said country number/limited symbol rate correspondence table, to notify said reception side apparatus of a combination of limited symbol rates corresponding to said country number, as information identifying a combination of symbol rates available to said communication terminal apparatus to make a communication with said reception side apparatus.

8. A communication terminal apparatus adapted to notify a reception side apparatus at a specified destination telephone number of at least information identifying a combination of symbol rates available to said communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication terminal apparatus comprising:

a telephone number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of destination telephone numbers; and a communication controller responsive to a specified destination telephone number being entered into said communication terminal apparatus upon initiating a call, to determine whether said specified destination telephone number is limited in symbol rate by referring to said telephone number/limited symbol rate correspondence table, said communication controller, when determining that said specified destination telephone number is limited in symbol rate, notifying said reception side apparatus of a corresponding combination of limited symbol rates as information identifying a combination of symbol rates available to said communication terminal apparatus to make a communication with said reception side apparatus.

9. A communication terminal apparatus according to claim 8, further comprising:
   a communication state detector for detecting a symbol rate and a bit rate determined by said reception side apparatus and used to actually make a communication between said communication terminal apparatus and said reception side apparatus, said reception side apparatus being connected through said communication controller to said communication terminal apparatus through a line in response to a call made by said communication terminal apparatus to a destination telephone number stored in said telephone number/limited symbol rate correspondence table; and
   a symbol rate limitation controller responsive to a symbol rate detected by said communication state detector after the communication has been normally completed without producing errors, wherein when said detected symbol rate is a highest symbol ratea from among those included in the combination of limited symbol rates stored in said telephone number/limited symbol rate correspondence table corresponding to said destination telephone number, and when a bit rate detected by said communication state detecting means is an upper limit bit rate which can be set at said highest symbol rate, said symbol rate limitation controller additionally sets a symbol rate one rank higher than said highest symbol rate within the combination of symbol rates essentially available to said communication terminal apparatus as the combination of limited symbol rates stored in said telephone number/limited symbol rate correspondence table corresponding to said destination telephone number.

10. A communication terminal apparatus adapted to notify a reception side apparatus at a specified destination telephone number of at least information identifying a combination of symbol rates available to said communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication terminal apparatus comprising:
   an identification number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of identification numbers; and
   a communication controller responsive to a specified destination telephone number being entered into said communication terminal apparatus upon initiating a call, to determine whether a number sequence at a beginning of said specified destination telephone number is coincident with an identification number which is limited in symbol rate by referring to said identification number/limited symbol rate correspondence table, said communication controller, when determining that said identification number is limited in symbol rate, notifying said reception side apparatus of a corresponding combination of limited symbol rates as information identifying the combination of symbol rates available to said communication terminal apparatus to make a communication with said reception side apparatus.

11. A communication terminal apparatus adapted to notify a reception side apparatus at a specified destination telephone number of at least information identifying a combination of symbol rates available to said communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication terminal apparatus comprising:
   an identification number registration table for storing previously registered identification numbers;
   a country number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of country numbers; and
   a communication controller responsive to a specified destination telephone number being entered into said communication terminal apparatus upon initiating a call, to reference said identification number registration table and said country number/limited symbol rate correspondence table, said communication controller, when a number sequence at a beginning of said specified destination telephone number has been registered as an identification number in said identification number registration table, and when a number sequence subsequent to said identification number in said destination telephone number represents a country number registered in said country number/limited symbol rate correspondence table, notifying said reception side apparatus of a combination of limited symbol rates corresponding to said country number, as information identifying a combination of symbol rates available to said communication terminal apparatus to make a communication with said reception side apparatus.

12. A communication terminal apparatus adapted to notify a reception side apparatus at a specified destination telephone number of at least information identifying a combination of symbol rates available to said communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication terminal apparatus comprising:
   a telephone number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of destination telephone numbers;
   an identification number registration table for storing previously registered identification numbers;
   a country number/limited symbol rate correspondence table for storing a combination of limited symbol rates set by selecting at least a portion of the combination of symbol rates essentially available to said communication terminal apparatus, said combination of limited symbol rates being stored corresponding to each of a plurality of country numbers; and a communication controller responsive to a specified destination telephone number being entered into said communication terminal apparatus upon initiating a call, to reference said telephone number/limited symbol rate correspondence table, said identification number registration table and said country number/limited symbol rate correspondence table, said communication controller, when said specified destination telephone number is registered in said telephone number/limited symbol rate correspondence table, notifying said reception side apparatus of a combination of limited symbol rates corresponding to said destination telephone number as information identifying a combination of symbol rates available to said communication terminal apparatus to make a communication with said reception side apparatus, and said communication controller, when said specified destination telephone number is not registered in said telephone number/limited symbol rate correspondence table, and when a number sequence at the beginning of said specified destination telephone number has been registered as an identification number in said identification number registration table and when a number sequence subsequent to said identification number in said destination telephone number represents a country number registered in said country number/limited symbol rate correspondence table, notifying said reception side apparatus of a combination of limited symbol rates corresponding to said country number, as information identifying a combination of symbol rates available to said communication terminal apparatus to make a communication with said reception side apparatus.

13. A communication terminal apparatus adapted to notify a reception side apparatus at a specified destination telephone number of at least information identifying a combination of symbol rates available to said communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication terminal apparatus comprising:

an identification number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of identification numbers;

a country number/limited symbol rate correspondence table for storing a combination of limited symbol rates set by selecting at least a portion of the combination of symbol rates essentially available to said communication terminal apparatus, said combination of limited symbol rates being stored corresponding to each of a plurality of country numbers; and a communication controller responsive to a specified destination telephone number being entered into said communication terminal apparatus upon initiating a call, to reference said identification number/limited symbol rate correspondence table and said country number/limited symbol rate correspondence table, wherein when a number sequence at a beginning of said destination telephone number has been registered as an identification number in said identification number/limited symbol rate correspondence table, said communication controller being operative when a number sequence subsequent to said identification number in said destination telephone number represents a country number registered in said country number/limited symbol rate correspondence table, to notify said reception side apparatus of a combination of limited symbol rates corresponding to said country number, as information identifying a combination of symbol rates available to said communication terminal apparatus, to make a communication with said reception side apparatus; and when said number sequence subsequent to said identification number in said destination telephone number does not represent a country number registered in said country number/limited symbol rate correspondence table, to notify said reception side apparatus of a combination of limited symbol rates corresponding to said identification number, as information identifying a combination of symbol rates available to said communication terminal apparatus, to make a communication with said reception side apparatus.

14. A communication terminal apparatus adapted to notify a reception side apparatus at a specified destination telephone number of at least information identifying a combination of symbol rates available to said communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication terminal apparatus comprising:

an identification number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of identification numbers;

a country number/limited symbol rate correspondence table for storing a combination of limited symbol rates set by selecting at least a portion of the combination of symbol rates essentially available to said communication terminal apparatus, said combination of limited symbol rates being stored corresponding to each of a plurality of country numbers; and a communication controller responsive to a specified destination telephone number being entered into said communication terminal apparatus upon initiating a call to reference said identification number/limited symbol rate correspondence table and said country number/limited symbol rate correspondence table, said communication controller, when a number sequence at the beginning of said destination telephone number has been registered as an identification number in said identification number/limited symbol rate correspondence table, notifying said reception side apparatus of a combination of limited symbol rates corresponding to said identification number, as information identifying a combination of symbol rates available to said communication terminal apparatus to make a communication with said reception side apparatus, and said communication controller, when the number sequence at the beginning of said destination telephone number is not registered as an identification number in said identification number/limited symbol rate correspondence table, and when a number sequence subsequent to said identification number in said destination telephone number represents a country number registered in said country number/limited symbol rate correspondence table, notifying said reception side apparatus of a combination of limited symbol rates corresponding to said country number, as information identifying a combination of symbol rates available to said communication terminal apparatus to make a communication with said reception side apparatus.

15. A communication method for notifying a reception side apparatus at a specified destination telephone number of at least information identifying a combination of symbol rates available to said communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication method comprising:

providing a telephone number/limited symbol rate correspondence table storing a combination of limited symbol rates set by selecting at least a portion of a combination of symbol rates essentially available to said communication terminal apparatus, said combination of limited symbol rates being stored corresponding to each of a plurality of destination telephone numbers; and controlling, in response to a specified destination telephone number being entered into said communication terminal apparatus upon initiating a call, to determine whether said specified destination telephone number is limited in symbol rate by referring to said telephone number/limited symbol rate correspondence table, wherein when it is determined that said specified destination telephone number is limited in symbol rate, said reception side apparatus is notified of a corresponding combination of limited symbol rates as information identifying a combination of symbol rates available to said communication terminal apparatus to make a communication with said reception side apparatus.

16. A communication method according to claim 15, further comprising steps of:

detecting a symbol rate and a bit rate determined by said reception side apparatus and used to actually make a communication between said communication terminal apparatus and said reception side apparatus, said reception side apparatus being connected through said communication controller to said communication terminal apparatus through a line in response to a call made by said communication terminal apparatus to a destination telephone number stored in said telephone number/limited symbol rate correspondence table; and controlling a symbol rate in response to a symbol rate being detected after the communication has been normally completed without producing errors, wherein when said detected symbol rate is a highest symbol ratea from among those included in the combination of limited symbol rates stored in said telephone number/limited symbol rate correspondence table corresponding to said destination telephone number, and when a bit rate detected is an upper limit bit rate which can be set at said highest symbol rate, said symbol rate is set one rank higher than said highest symbol rate within the combination of symbol rates essentially available to said communication terminal apparatus as the combination of limited symbol rates stored in said telephone number/limited symbol rate correspondence table corresponding to said destination telephone number.

17. A communication method adapted to notify a reception side apparatus at a specified destination telephone number of at least information identifying a combination of symbol rates available to said communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication method comprising:

providing an identification number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of identification numbers; and in response to a specified destination telephone number being entered into said communication terminal apparatus upon initiating a call, determining whether a number sequence at a beginning of said specified destination telephone number is coincident with an identification number which is limited in symbol rate by referring to said identification number/limited symbol rate correspondence table, and when determining that said identification number is limited in symbol rate, notifying said reception side apparatus of a corresponding combination of limited symbol rates as information identifying the combination of symbol rates available to said communication terminal apparatus to make a communication with said reception side apparatus.

18. A communication method to notify a reception side apparatus at a specified destination telephone number of at least information identifying a combination of symbol rates available to a communication terminal apparatus from among a plurality of symbol rates defined by a predetermined communication standard, to communicate with a reception side apparatus at a symbol rate and a bit rate determined by said reception side apparatus based on the notified information identifying the combination of symbol rates and the characteristics of said line connected thereto, said communication method comprising:

providing an identification number registration table for storing previously registered identification numbers;

providing a country number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of country numbers; and in response to a specified destination telephone number being entered into said communication terminal apparatus upon initiating a call, referencing said identification number registration table and said country number/limited symbol rate correspondence table, and when a number sequence at a beginning of said specified destination telephone number has been registered as an identification number in said identification number registration table, and when a number sequence subsequent to said identification number in said destination telephone number represents a country number registered in said country number/limited symbol rate correspondence table, notifying said reception side apparatus of a combination of limited symbol rates corresponding to said country number, as information identifying a combination of symbol rates available to said communication terminal apparatus to make a communication with said reception side apparatus.

19. A communication method to notify a reception side apparatus at a specified destination telephone number of at least information identifying a combination of symbol rates available to a communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication method comprising:

providing a telephone number/limited symbol rate correspondence table storing a combination of limited symbol rates set by selecting at least a portion of a combination of symbol rates essentially available to said communication terminal apparatus, said combination of limited symbol rates being stored corresponding to each of a plurality of destination telephone numbers;

providing an identification number registration table for storing previously registered identification numbers;

providing a country number/limited symbol rate correspondence table for storing a combination of limited symbol rates set by selecting at least a portion of the combination of symbol rates essentially available to said communication terminal apparatus, said combination of limited symbol rates being stored corresponding to each of a plurality of country numbers; and in response to a specified destination telephone number being entered into said communication terminal apparatus upon initiating a call, referencing said telephone number/limited symbol rate correspondence table, said identification number registration table and said country number/limited symbol rate correspondence table, wherein when said specified destination telephone number is registered in said telephone number/limited symbol rate correspondence table, said reception side apparatus is notified of a combination of limited symbol rates corresponding to said destination telephone number as information identifying a combination of symbol rates available to said communication terminal apparatus to make a communication with said reception side apparatus, and when said specified destination telephone number is not registered in said telephone number/limited symbol rate correspondence table, and when a number sequence at the beginning of said specified destination telephone number has been registered as an identification number in said identification number registration table and when a number sequence subsequent to said identification number in said destination telephone number represents a country number registered in said country number/limited symbol rate correspondence table, notifying said reception side apparatus of a combination of limited symbol rates corresponding to said country number, as information identifying a combination of symbol rates available to said communication terminal apparatus to make a communication with said reception side apparatus.

20. A communication method to notify a reception side apparatus at a specified destination telephone number of at least information identifying a combination of symbol rates available to a communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication method comprising:

providing an identification number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of identification numbers;

providing a country number/limited symbol rate correspondence table for storing a combination of limited symbol rates set by selecting at least a portion of the combination of symbol rates essentially available to said communication terminal apparatus, said combination of limited symbol rates being stored corresponding to each of a plurality of country numbers; and in response to a specified destination telephone number being entered into said communication terminal apparatus upon initiating a call, referencing said identification number/limited symbol rate correspondence table and said country number/limited symbol rate correspondence table, wherein when a number sequence at a beginning of said destination telephone number has been registered as an identification number in said identification number/limited symbol rate correspondence table, and when a number sequence subsequent to said identification number in said destination telephone number represents a country number registered in said country number/limited symbol rate correspondence table, notifies said reception side apparatus of a combination of limited symbol rates corresponding to said country number, as information identifying a combination of symbol rates available to said communication terminal apparatus, to make a communication with said reception side apparatus; and when said number sequence subsequent to said identification number in said destination telephone number does not represent a country number registered in said country number/limited symbol rate correspondence table, to notify said reception side apparatus of a combination of limited symbol rates corresponding to said identification number, as information identifying a combination of symbol rates available to said communication terminal apparatus, to make a communication with said reception side apparatus.

21. A communication method to notify a reception side apparatus at a specified destination telephone number of at least information identifying a combination of symbol rates available to a communication terminal apparatus from among a plurality of symbol rates defined by a predetermined communication standard, to communicate with said reception side apparatus at a symbol rate and a bit rate determined by said reception side apparatus based on the notified information identifying the combination of symbol rates and the characteristics of said line connected thereto, said communication method comprising:

provmaking an identification number/limited symbol rate correspondence table for storing a combination of limited symbol rates set by selecting at least a portion of a combination of symbol rates essentially available to said communication terminal apparatus, said combination of limited symbol rates being stored corresponding to each of a plurality of identification numbers;

providing a country number/limited symbol rate correspondence table for storing a combination of limited symbol rates set by selecting at least a portion of the combination of symbol rates essentially available to said communication terminal apparatus, said combination of limited symbol rates being stored corresponding to each of a plurality of country numbers; and in response to a specified destination telephone number being entered into said communication terminal apparatus upon initiating a call to reference said identification number/limited symbol rate correspondence table and said country number/limited symbol rate correspondence table, when a number sequence at the beginning of said destination telephone number has been registered as an identification number in said identification number/limited symbol rate correspondence table, notifying said reception side apparatus of a combination of limited symbol rates corresponding to said identification number, as information identifying a combination of symbol rates available to said communication terminal apparatus to make a communication with said reception side apparatus, and when the number sequence at the beginning of said destination telephone number is not registered as an identification number in said identification number/limited symbol rate correspondence table, and when a number sequence subsequent to said identification number in said destination telephone number represents a country number registered in said country number/limited symbol rate correspondence table, notifying said reception side apparatus of a combination of limited symbol rates corresponding to said country number, as information identifying a combination of symbol rates available to said communication terminal apparatus to make a communication with said reception side apparatus.

* * * * *